US008157476B2

(12) United States Patent  (10) Patent No.: US 8,157,476 B2
Pugh et al.  (45) Date of Patent: Apr. 17, 2012

(54) IN-SITU SYSTEMS AND METHODS FOR THE IMMOBILIZATION OF CONTAMINANTS

(75) Inventors: John D. Pugh, McCalla, AL (US); James C. Redwine, Vestavia Hills, AL (US); David W. Morris, Chelsea, AL (US)

(73) Assignee: Southern Company Services, Inc., Birmingham, AL (US)

( * ) Notice: Subject to any disclaimer, the term of this patent is extended or adjusted under 35 U.S.C. 154(b) by 343 days.

(21) Appl. No.: 12/561,070

(22) Filed: Sep. 16, 2009

(65) Prior Publication Data

US 2010/0098494 A1  Apr. 22, 2010

Related U.S. Application Data

(60) Provisional application No. 61/097,469, filed on Sep. 16, 2008.

(51) Int. Cl.
*B09C 1/00* (2006.01)
(52) U.S. Cl. .................................................. 405/128.75
(58) Field of Classification Search ............... 405/128.1, 405/128.75; 299/128.1, 128.75
See application file for complete search history.

(56) References Cited

U.S. PATENT DOCUMENTS

| 4,723,992 | A |   | 2/1988  | Hager        |         |
|-----------|---|---|---------|--------------|---------|
| 5,252,003 | A |   | 10/1993 | McGahan      |         |
| 5,324,433 | A |   | 6/1994  | Grant et al. |         |
| 5,603,838 | A | * | 2/1997  | Misra et al. | 210/665 |
| 5,700,107 | A |   | 12/1997 | Newton       |         |
| 5,769,961 | A |   | 6/1998  | Peters et al.|         |
| 5,833,855 | A | * | 11/1998 | Saunders     | 210/611 |
| 6,132,623 | A |   | 10/2000 | Nikolaidis et al. |    |
| 6,210,078 | B1| * | 4/2001  | Redwine et al.| 405/263|
| 6,242,663 | B1|   | 6/2001  | Ponder et al.|         |
| 6,254,312 | B1|   | 7/2001  | Chowdhury et al. |     |
| 6,350,383 | B1| * | 2/2002  | Douglas      | 210/679 |

(Continued)

FOREIGN PATENT DOCUMENTS

CA  2307961 A1  12/2000

(Continued)

OTHER PUBLICATIONS

Donahoe, Rona J. et al., "In Situ Chemical Fixation of Arsenic-Contaminated Soil: Literature Review and Laboratory Treatability Study", EPRI, Palo Alto, CA and Southern Company Generation, 1014056, Birmingham, AL, pp. 1-88, Sep. 2007.

(Continued)

*Primary Examiner* — John Kreck
(74) *Attorney, Agent, or Firm* — Ryan A. Schneider, Esq.; Troutman Sanders LLP

(57) ABSTRACT

The various embodiments of the present invention relate generally to remediation of contaminants in the environment, and more specifically to improved chemistries, systems, and methods for in-situ immobilization of contaminants in various media. More particularly, an aspect of the present invention is directed to an in-situ method for immobilizing a contaminant in a medium, comprising: contacting a medium in-situ with a chemical reagent, the medium comprising a contaminant, wherein the contacting the medium in-situ with a chemical reagent does not involve physical mixing of the medium and the chemical reagent; and immobilizing at least a portion of the contaminant in the medium in-situ to yield an immobilized contaminant in the medium, wherein the immobilized contaminant in the medium is neither extracted from the medium nor degraded by the chemical reagent.

14 Claims, 18 Drawing Sheets

U.S. PATENT DOCUMENTS

| | | | |
|---|---|---|---|
| 6,387,276 | B1 | 5/2002 | Nikolaidis et al. |
| 6,492,572 | B2 | 12/2002 | Batchelor et al. |
| 6,830,695 | B1 | 12/2004 | Brady et al. |
| 7,138,060 | B2 | 11/2006 | Cuthbertson |
| 7,141,173 | B2 | 11/2006 | Bethke |
| 2002/0006867 | A1 | 1/2002 | Ponder et al. |
| 2006/0046297 | A1 | 3/2006 | Ball |
| 2007/0051676 | A1 | 3/2007 | Chandraghatgi et al. |
| 2007/0203388 | A1 | 8/2007 | Zhao et al. |
| 2007/0256985 | A1 | 11/2007 | Zhao et al. |
| 2008/0075537 | A1 | 3/2008 | Seech et al. |

FOREIGN PATENT DOCUMENTS

| | | | |
|---|---|---|---|
| JP | 10263522 | A | 10/1998 |
| JP | 2006150354 | A | 6/2006 |
| JP | 2007253059 | A | 10/2007 |
| WO | 2004069439 | A1 | 8/2004 |
| WO | 2007126779 | A2 | 11/2007 |

OTHER PUBLICATIONS

Illera, V et al., "Soil Remediation of an Arsenic-Contaminated Site with Ferrous Sulfate and Type V Portland Cement", American Geophysical Union, Abstract No. B31A-0954, pp. 1-2, Fall Meeting 2005.

Jacobs, Jim et al., "In-Situ Remediation of Heavy Metals Using Sulfur-Based Treatment Technologies", Fast-Tek, Http://www.fast-tek.com/article-hv01-in-situ-metalsremediation.pdf, pp. 1-4, Mar. 12, 2008.

Jacobs, Jim, "Metals Stabilization Using Geochemical Fixation", Ebsinfo, http://www.ebsinfo.com/Metals_Stabilization.pdf, pp. 1-4, Mar. 12, 2008.

Lien, Hsing-Lung et al., "High-Level Arsenite Removal from Groundwater by Zero-Valent Iron", Chemosphere, vol. 59, pp. 377-386, 2005.

Manning, Bruce A. et al., "Arsenic(III) and Arsenic(V) Reactions with Zerovalent Iron Corrosion Products", Environmental Science & Technology, vol. 36, No. 24, pp. 5455-5461, 2002.

Martin, Todd A. et al., "In Situ Remediation of Arsenic in Contaminated Soil", Remediation Journal, vol. 14, Issue 1, pp. 21-32, Dec. 19, 2003.

Mulligan, C.N. et al., "Remediation Technologies for Metal-Contaminated Soils and Groundwater: An Evaluation", Engineering Geology, vol. 60, pp. 193-207, 2001.

Redwine, James C. et al., "In-Situ Chemical Fixation of Arsenic in Soil: Laboratory and Field Results", Proceedings of Air Waste Management Association 97th Annual Conference Exhibition, Indianapolis, IN, Control No. 548, pp. 1-9, 2004.

Rouse, Jim V. et al., "A Geochemical Way to Keep Metals at Bay", Environmental Engineering World, pp. 6-11, May-Jun. 1996.

Rouse, Jim V., "Natural and Enhanced Attenuation of CCA Components in Soil and Groundwater", Paper Presentation for the 93rd Annual Meeting of the American Wood-Preservers' Association, pp. 414-425, Apr. 27-29, 1997.

Sabatini, David A. et al., "Innovative Measures for Subsurface Chromium Remediation: Source Zone, Concentrated Plume, and Dilute Plume", Environmental Protection Agency, Environmental Research Brief, EPA/600/S-97/005, pp. 1-16, Sep. 1997.

Su, Chunming et al., "Arsenate and Arsenite Removal by Zerovalent Iron: Kinetics, Redox Transformation, and Implications for In Situ Groundwater Remediation", Environmental Science & Technology, vol. 35, No. 7, pp. 1487-1492, 2001.

Su, Chunming et al., "In Situ Remediation of Arsenic in Stimulated Groundwater Using Zerovalent Iron: Laboratory Column Tests on Combined Effects of Phosphate and Silicate", Environmental Science & Technology, vol. 37, No. 11, pp. 2582-2587, 2003.

U.S. Environmental Protection Agency, "In Situ Treatment of Soil and Groundwater Contaminated with Chromium", Technical Resource Guide, Office of Research and Development, EPA/625/R-00/005, 84 Pages including Roman Numerals i-xi, Oct. 2000.

Voigt, D.E. et al., "Chemical Fixation of Arsenic in Contaminated Soils", Applied Geochemistry, vol. 11, pp. 633-643, Sep. 1996.

Yang, Li et al., "In Situ Chemical Fixation of Arsenic-Contaminated Soils: An Experimental Study", Lawrence Berkeley National Laboratory, Paper NBNL-63522, http://respositories.cdlib.org, pp. 1-14, Mar. 27, 2007.

Zhang, Wei-Xian, "Nanoscale Iron Particles for Environmental Remediation: An Overview", Journal of Nanoparticle Research, vol. 5, pp. 323-332, 2003.

* cited by examiner

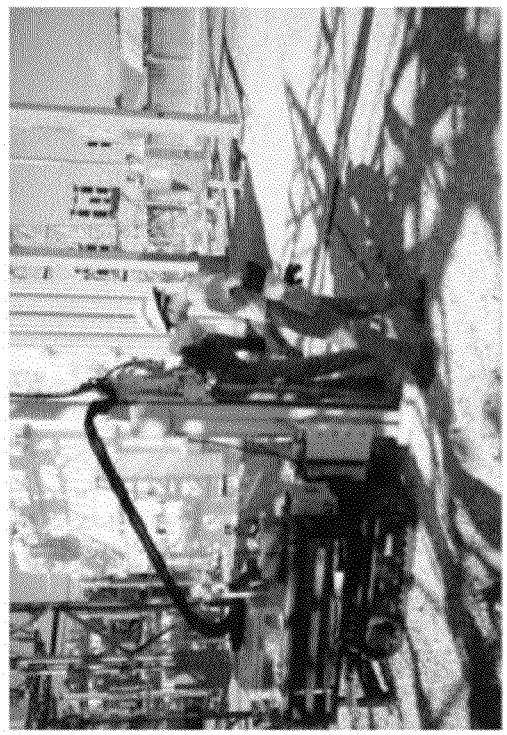
Injection via Direct Push Technology
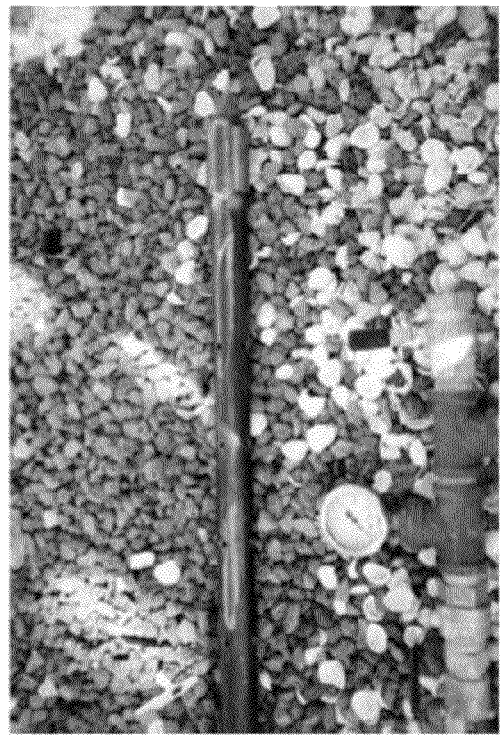
Typical Injector Rod
FIGURE 6

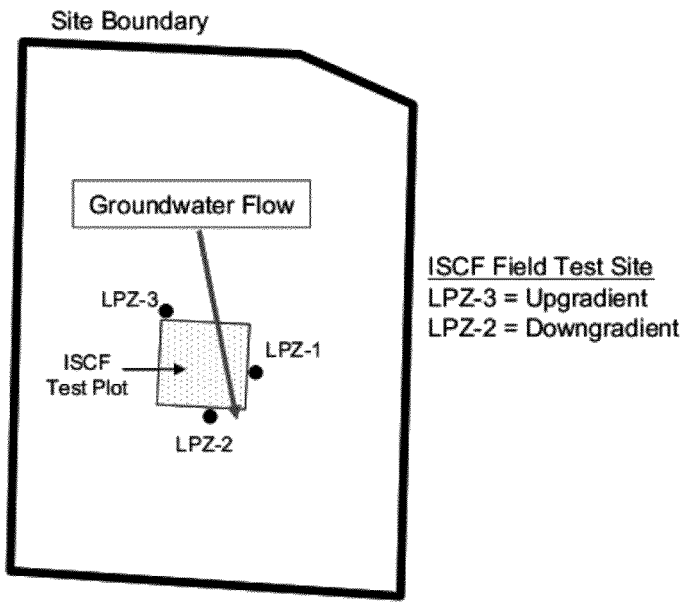
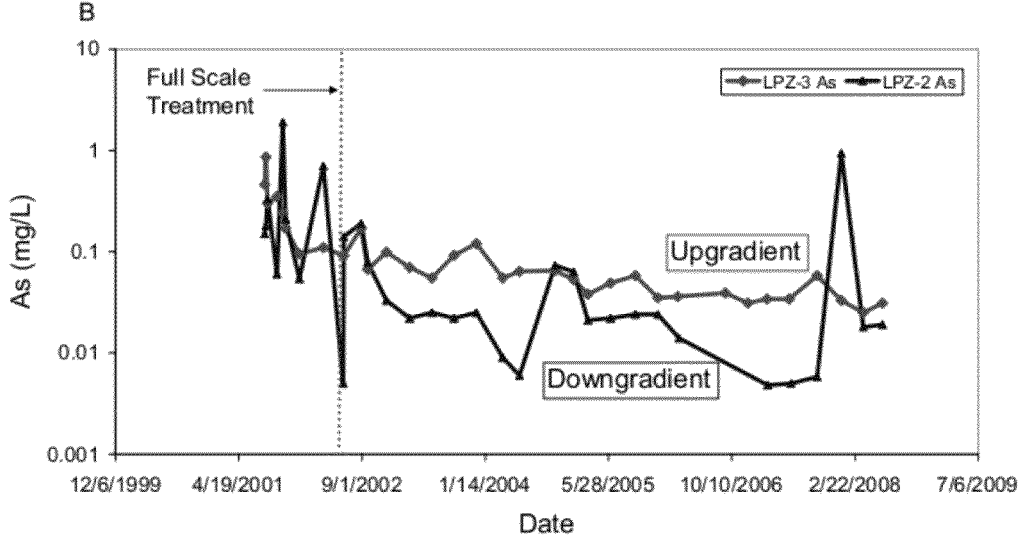
FIGURES 7A-B

| Environment | Fixation Mechanisms |
|---|---|
| Unsaturated zone (aerobic) | Adsorption to iron oxyhydroxide<br>Precipitation as $FeAsO_4 \cdot 2H_2O$<br>Co-precipitation with iron oxides<br>Adsorption to iron oxides |
| Zone of water table fluctuation (alternating aerobic and anaerobic) | ↔ Combinations of saturated and unsaturated zone mechanisms |
| Saturated zone (anaerobic) | Arsenic sulfide precipitation<br>Co-precipitation with $FeS_2$<br>Precipitation of FeAsS<br>Adsorption to $FeS_2$<br>Adsorption to reduced iron oxides<br>Incorporation into apatite |

FIGURE 11

IN-SITU SYSTEMS AND METHODS FOR THE IMMOBILIZATION OF CONTAMINANTS

RELATED APPLICATION

This application claims, under 35 U.S.C. §119(e), the benefit of U.S. Provisional Application Ser. No. 61/097,469, filed 16 Sep. 2008, the entire contents and substance of which are hereby incorporated by reference as if fully set forth below.

TECHNICAL FIELD

The various embodiments of the present invention relate generally to remediation of contaminants in the environment, and more specifically to improved chemistries, systems, and methods for in-situ immobilization of contaminants in various media.

BACKGROUND OF THE INVENTION

Remediation of toxic and hazardous contaminants in the environment is a growing concern. The United States Environmental Protection Agency and various state regulators continue to develop more stringent standards based on toxicological studies and the perceived risk of these contaminants. As a result, environmental remediation is an area of intense research.

For example, contaminated groundwater can, depending on the contaminants, pose serious health problems when used as a source of drinking water or as irrigation for growing crops and vegetation. Prevention or elimination of groundwater contamination is a major emphasis of research on remediation, not only of groundwater itself, but of soil and other media which can contribute to contamination of groundwater via leaching.

Excavation and disposal is a widely-applied technology for remediation of contaminated soil. Excavation, however, is not always feasible. For example, excavation under existing structures or to great depths can be cost-prohibitive or physically impossible. Further, even after soil excavation, a groundwater contamination plume can often remain.

Therefore, there remains a need for improved methods for remediation of contaminated media. It would be beneficial if such methods were cost-effective and/or easily carried out. It would also be beneficial if such methods provided for in-situ treatment of the contaminants, so as not to require physical removal of the contaminant and/or significant disturbance of the treated medium.

BRIEF SUMMARY OF THE INVENTION

The various embodiments of the present invention relate generally to remediation of contaminants in the environment, and more specifically to improved chemistries, systems, and methods for in-situ immobilization of contaminants in various media.

An aspect of the present invention comprises an in-situ method for immobilizing a contaminant in a medium, comprising: contacting a medium in-situ with a chemical reagent, the medium comprising a contaminant, wherein the contacting the medium in-situ with a chemical reagent does not involve physical mixing of the medium and the chemical reagent; and immobilizing at least a portion of the contaminant in the medium in-situ to yield an immobilized contaminant in the medium, wherein the immobilized contaminant in the medium is neither extracted from the medium nor degraded by the chemical reagent. The contaminant can comprise an alkali metal, an alkali earth metal, a transition metal, a nonmetal, a main group metal, a lanthanide, or an actinide. In an exemplary embodiment of the present invention, the contaminant can comprise arsenic.

The chemical reagent can comprise a metal salt, such as an iron-containing salt, a lanthanum-containing salt, or a combination thereof. In an exemplary embodiment of the present invention, the iron-containing salt can comprise ferrous sulfate, ferric chloride, ferric sulfate, or combinations thereof. In embodiments of the present invention where the contaminant comprises arsenic, an amount of iron-containing salt can be provided to the medium so that a molar ratio of iron to arsenic of at least about 10 to about 1 is achieved. In some embodiments of the present invention, the chemical reagent comprises ferrous sulfate and lanthanum chloride. In such embodiments, the weight-based ratio of lanthanum to iron is about 1.2 to about 1. In some embodiments of the present invention, in-situ methods for immobilizing a contaminant can further comprise providing a chemical additive to the medium, such as chelating agents, pH-modifying chemicals (e.g., inorganic or organic acids, bases, and/or buffers), adsorbents, precipitants, surfactants, surface-tension altering agents, porosity modifying agents, and/or permeability-modifying agents.

In one embodiment of the present invention, in-situ methods for immobilizing a contaminant in a medium can further comprise flushing the medium in-situ with a flushing agent in a flushing zone, wherein the flushing agent mobilizes at least a portion of the contaminant in the medium. In another embodiment of the present invention, in-situ methods for immobilizing a contaminant in a medium can further comprise capturing at least a portion of the flushing agent with a neutralizing agent in the medium in-situ in a capture zone, the capture zone located down-gradient from the flushing zone. In yet another embodiment of the present invention, in-situ methods for immobilizing a contaminant in a medium can further comprise extracting at least a portion of the flushing agent and the contaminant from the medium within or down-gradient of the flushing zone. In an exemplary embodiment, an in-situ method for immobilizing a contaminant in a medium can further comprise: flushing the medium in-situ with a flushing agent in a flushing zone, wherein the flushing agent mobilizes at least a portion of the contaminant in the medium; extracting at least a portion of the flushing agent and the contaminant from the medium within or down-gradient of the flushing zone; and capturing at least a portion of the flushing agent with a neutralizing agent in the medium in-situ in a capture zone, the capture zone located down-gradient from the flushing zone. A flushing agent can comprise a Lewis acid, a Lewis base, a Bronsted acid, a Bronsted base, or a combination thereof. For example, the flushing agent can comprise phosphoric acid. In such embodiments, the chemical reagent can comprise an iron-containing salt, and the neutralizing agent can comprise a calcium salt.

Another aspect of the present invention comprises an in-situ method for immobilizing arsenic in a soil, comprising: contacting a soil in-situ with a chemical reagent, the soil comprising arsenic and the chemical reagent comprising an iron-containing salt and a lanthanum-containing salt, wherein the contacting the soil in-situ with a chemical reagent does not involve physical mixing of the soil and the chemical reagent; and immobilizing the arsenic in the soil in-situ to yield immobilized arsenic the soil, wherein the immobilized arsenic in the soil is neither extracted from the soil nor degraded by the chemical reagent. In an embodiment of the present invention, the iron-containing salt can comprise ferrous sulfate, ferric chloride, ferric sulfate, or combinations thereof. In embodiments of the present invention where the contaminant comprises arsenic, an amount of iron-containing salt can be provided to the medium so that a molar ratio of iron to arsenic of at least about 10 to about 1 is achieved. In some embodiments of the present invention, the chemical reagent comprises ferrous sulfate and lanthanum chloride. In such embodiments, the weight-based ratio of lanthanum to iron is about 1.2 to about 1. In some embodiments of the present invention, in-situ methods for immobilizing a contaminant can further comprise providing a chemical additive to the medium, such as chelating agents, pH-modifying chemicals (e.g., inorganic or organic acids, bases, and/or buffers), adsorbents, precipitants, surfactants, surface-tension altering agents, porosity modifying agents, and/or permeability-modifying agents.

Yet another aspect of the present invention comprises a system for in-situ immobilization of arsenic in a soil, comprising: a chemical reagent capable of immobilizing arsenic in a soil, the chemical reagent comprising an iron-containing salt; and a chemical reagent delivery subsystem, wherein the chemical reagent delivery subsystem is configured to deliver the chemical reagent to the soil in-situ, and wherein delivery of the chemical reagent to the soil in-situ does not involve physical mixing of the soil and the chemical reagent. In one embodiment, the molar ratio of iron to arsenic is at least about 10 to about 1. In another embodiment, the chemical reagent comprising an iron-containing salt can further comprise a lanthanum-containing salt. In such embodiments, the weight-based ratio of the lanthanum to iron is about 1.2 to about 1. According to some embodiments of the present invention, the chemical reagent delivery subsystem can comprise an injection system employing direct push methods, an injection system using a drilled borehole or a well, a surface application system, an irrigation system, or combinations thereof.

Other aspects and features of embodiments of the present invention will become apparent to those of ordinary skill in the art, upon reviewing the following description of specific, exemplary embodiments of the present invention in conjunction with the accompanying figures.

BRIEF DESCRIPTION OF DRAWINGS

These and other objects and features of this invention will be better understood from the following detailed description taken in conjunction with the drawings and attachments wherein:

FIG. 6 illustrates an example of direct push methods for application of chemical systems to contaminated media.

FIG. 7A illustrates an ISCF unsaturated zone treatment area, showing up-gradient (LPZ-3) and down-gradient (LPZ-2) wells.

FIG. 7B illustrates arsenic concentrations in the wells of FIG. 7A.

FIG. 11 illustrates various mechanisms by which a contaminant can be immobilized.

DETAILED DESCRIPTION OF THE INVENTION

Figure 1:
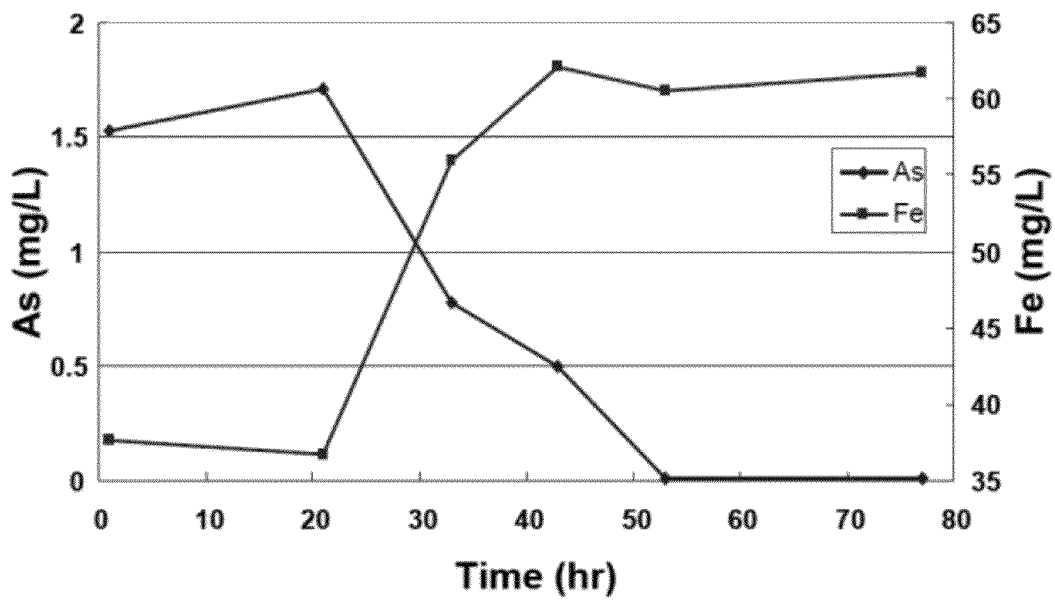
FIG. 1 illustrates the concept of in-situ chemical fixation (ISCF) using ferrous sulfate.

Referring now to the figures, wherein like reference numerals represent like parts throughout the several views, exemplary embodiments of the present invention will be described in detail. Throughout this description, various components may be identified having specific values or parameters; however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

The various embodiments of the present invention broadly pertain to improved chemical systems and methods for the in-situ treatment of contaminated media. In one embodiment of the present invention, an in-situ method for immobilizing a contaminant in a medium, can comprise: contacting a medium in-situ with a chemical reagent, the medium comprising a contaminant, wherein the contacting the medium in-situ with a chemical reagent does not involve physical mixing of the medium and the chemical reagent; and immobilizing at least a portion of the contaminant in the medium in-situ to yield an immobilized contaminant in the medium, wherein the immobilized contaminant in the medium is neither extracted from the medium nor degraded by the chemical reagent.

The systems and methods of the present invention can be applied to various media. As used herein, the term "medium" can comprise many media, including but not limited to, a fluid, liquid, solid, solution, suspension, emulsion, gas, vapor, gel, dispersion, a flowable material, a multiphase material, or combination thereof. In an exemplary embodiment of the present invention, the medium can be soil, rock, industrial waste, groundwater, or a combination comprising at least two of the foregoing, among others. One advantage of the systems and methods of the present invention is that the contaminant does not need to be extracted from the treated medium after the chemistries and/or methods have been implemented. In fact, the treated contaminant can simply be left in the medium.

The systems and methods of the various embodiments of the present invention can immobilize a variety of contaminants. In certain instances, the contaminant is an inorganic contaminant, such as a metal or metalloid. Examples of such inorganic contaminants that can be immobilized include, but are not limited to, metals or compounds containing an alkali metal (e.g., Li, Na, K, Rb, Cs, and Fr), an alkali earth metal (e.g., Be, Mg, Ca, Sr, Ba, and Ra), a transition metal (e.g., Sc, Y, Ti, Zr, Hg, V, Nb, Ta, Cr, Mo, W, Mn, Re, Ru, Fe, Os, Co, Rh, Ir, Ni, Pd, Pt, Cu, Ag, Au, Zn, Cd, and Hg), a nonmetal (e.g., B, C, Si, N, P, As, O, S, Se, Te, F, Cl, Br, I, and At), a main group metal (e.g., Al, Ga, Ge, In, Sn, Sb, Tl, Pb, Bi, and Po), a lanthanide, or an actinide. In an exemplary embodiment of the present invention, the contaminant is arsenic. Speciation changes in the contaminants are not required for systems and methods of the present invention to be effective.

The chemical systems and methods used for treating the contaminated medium generally include a chemical reagent. The chemical reagent can be in the form of a solid or liquid. In exemplary embodiments, the chemical reagent is a metal salt. In some instances the chemical reagent can be an iron-containing salt, for example ferrous sulfate, ferric chloride, ferric sulfate or combinations thereof. In other instances, the chemical reagent can be a lanthanum-containing salt (e.g., lanthanum chloride). It is also possible to use a combination of metal salts, such as a combination of one or more iron-containing salts and one or more lanthanum-containing salts (e.g., ferrous sulfate and lanthanum chloride).

As but one exemplary embodiment, soil and/or groundwater that is contaminated with arsenic can be treated with ferrous sulfate in a concentration of at least about 10 moles of iron per 1 mole of arsenic. In another exemplary embodiment, soil and/or groundwater that is contaminated with arsenic can be treated with ferrous sulfate and lanthanum chloride, where the weight-based ratio of lanthanum to iron is about 1.2 to about 1. For example, lanthanum chloride and ferrous sulfate can be added to a kg of water (kgw) in an amount of 391 mg of Fe and 322 mg of La, respectively. In another exemplary embodiment, soil and/or groundwater that is contaminated with arsenic can be treated with ferrous sulfate and lanthanum chloride, where the weight-based ratio of lanthanum to iron is at least about 1.2 to about 1.

Figure 3:
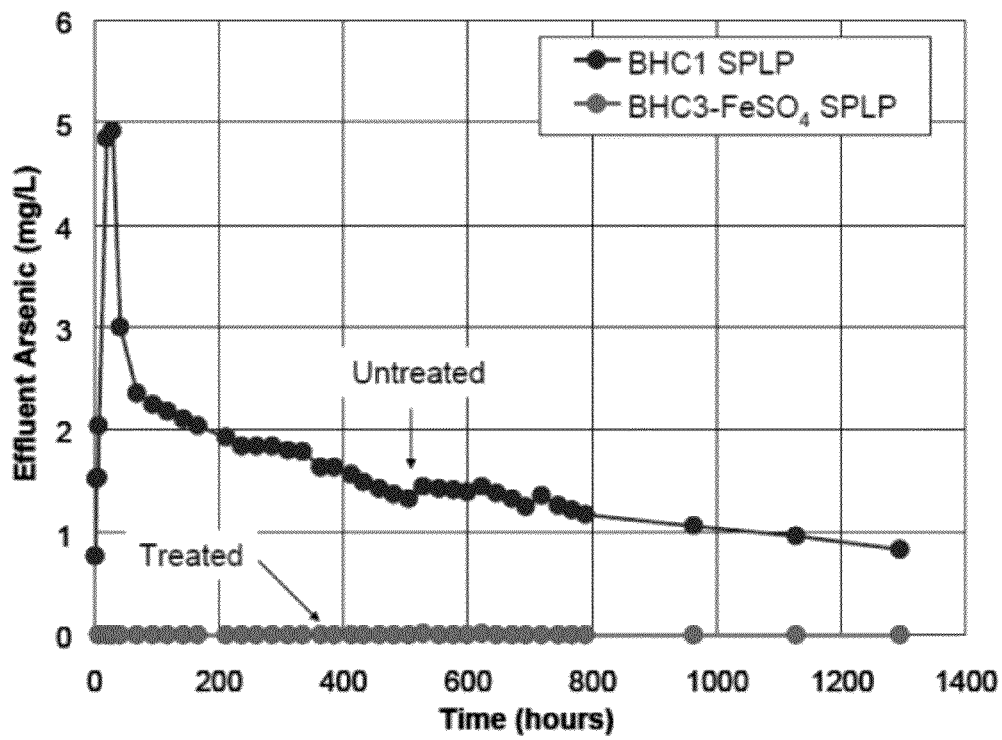
FIG. 3 illustrates the long term effectiveness of ISCF using a synthetic precipitation leaching procedure (SPLP) on untreated arsenic-contaminated soil ("BHC1") and arsenic-contaminated soil treated with ferrous sulfate (BHC3-$FeSO_4$).
Figure 4:
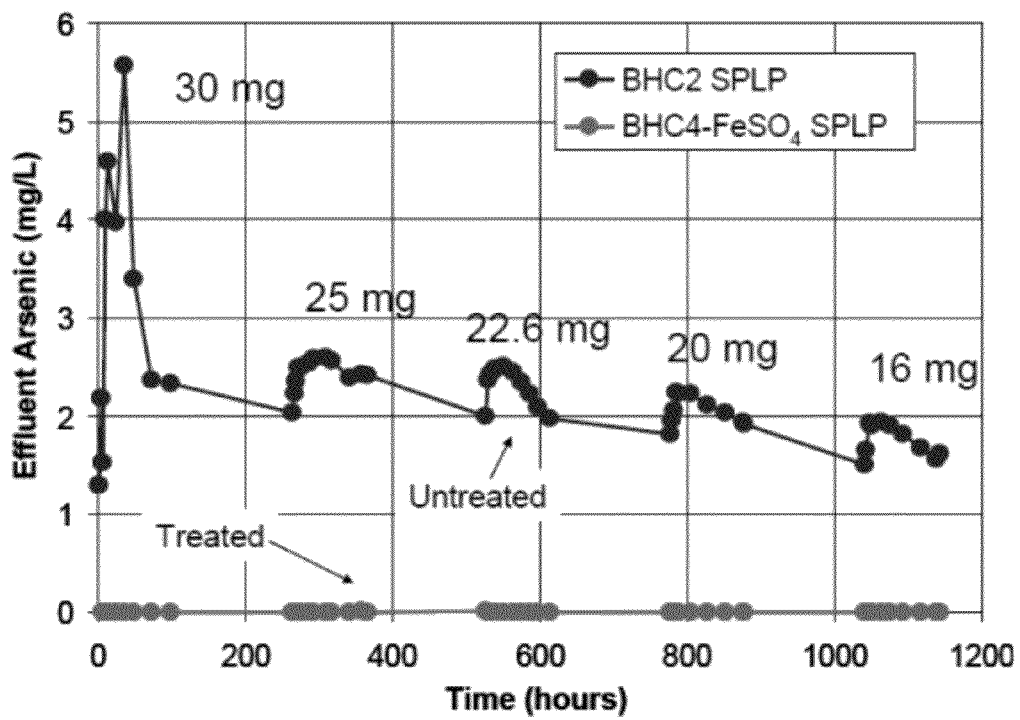
FIG. 4 illustrates the ability of ferrous sulfate treatment to eliminate arsenic leaching from contaminated soils during alternating periods of wetting and drying, which simulates periodic rainfall.
Figure 5:
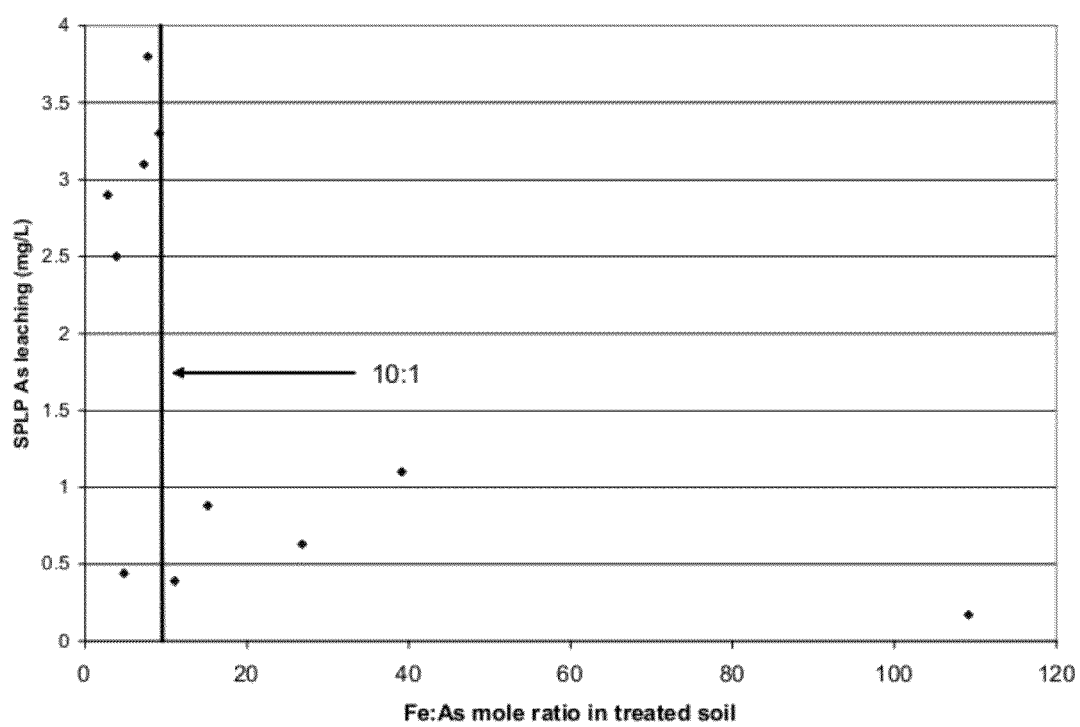
FIG. 5 illustrates the relationship between SPLP leaching results and resulting Fe:As molar ratio in treated soils, showing contrast above and below the 10:1 ratio.

Laboratory data show that this treatment is effective (FIG. 1) on a variety of soils (FIG. 2), and is permanent (FIG. 3) even under simulated rainfall conditions for long periods of time (FIG. 4). The use of an iron-containing salt (e.g., ferrous sulfate) can immobilize arsenic in both saturated zone and unsaturated zone arsenic-contaminated media (soils and aquifer sediments). For example, ferrous sulfate can be applied to the arsenic-contaminated media through a variety of methods to achieve in-situ remediation. In one embodiment, ferrous sulfate is mixed with a solvent, such as water, to achieve a desired concentration of iron in solution. This desired concentration can be the solubility limit of ferrous iron in that particular solvent to deliver the maximum amount of iron possible to the arsenic-contaminated media. According to some embodiments of the present invention, enough iron-containing solution is applied to the arsenic-contaminated media to achieve a final molar ratio of at least about 10 moles iron to 1 mole arsenic in the contaminated media (FIG. 5). To achieve this molar ratio, repeated applications may be necessary due to the solubility limit of ferrous sulfate in a particular solvent.

Although not wishing to be bound by any particular theory, it is believed that iron in solution is precipitated over time to form ferric hydroxide, having the formula $Fe(OH)_3(am)$. One such reaction that may occur is the following:

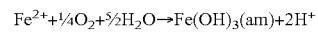

$$Fe^{2+} + \tfrac{1}{4}O_2 + \tfrac{5}{2}H_2O \rightarrow Fe(OH)_3(am) + 2H^+$$

whereby ferrous iron ($Fe^{2+}$) dissolved in water ($H_2O$) is oxidized by dissolved oxygen ($O_2$), and two protons of hydrogen ($H^+$) are produced in addition to amorphous ferric hydroxide [$Fe(OH)_3(am)$]. It is believed that the precipitated iron forms a solid phase amorphous ferric hydroxide coating on or surrounding the arsenic-contaminated media. Arsenic is preferentially bound to the newly precipitated ferric hydroxide by a surface complexation reaction, such as described by Hiemstra and van Riemsdijk (1996) and Stachowicz et al. (2006). The surface complex is stable and prevents further leaching of arsenic from contaminated media into solutions such as surface water or groundwater. Over time, the arsenic may become incorporated into an arsenate mineral structure such as scorodite (ferric arsenate) or symplesite (ferrous arsenate).

In embodiments of the present invention comprising a combination of metal salts, such as a combination of one or more iron-containing salts and one or more lanthanum-containing salts (e.g., ferrous sulfate and lanthanum chloride), it is believed that the lanthanum acts as an adsorbent when it forms lanthanum hydroxide to supplement ferric hydroxide. As discussed above, ferrous sulfate has a solubility limit in many solvents. Therefore, the solubility of ferrous iron limits the amount of chemical reagent that can be delivered to the medium in a single administration. Utilizing a lanthanum-containing salt in addition to the iron-containing salt provides the ability to deliver more adsorbent to the soil at once, increasing the robustness of the chemical reagent and reducing costs associated with multiple applications (e.g., field labor).

Figure 2:
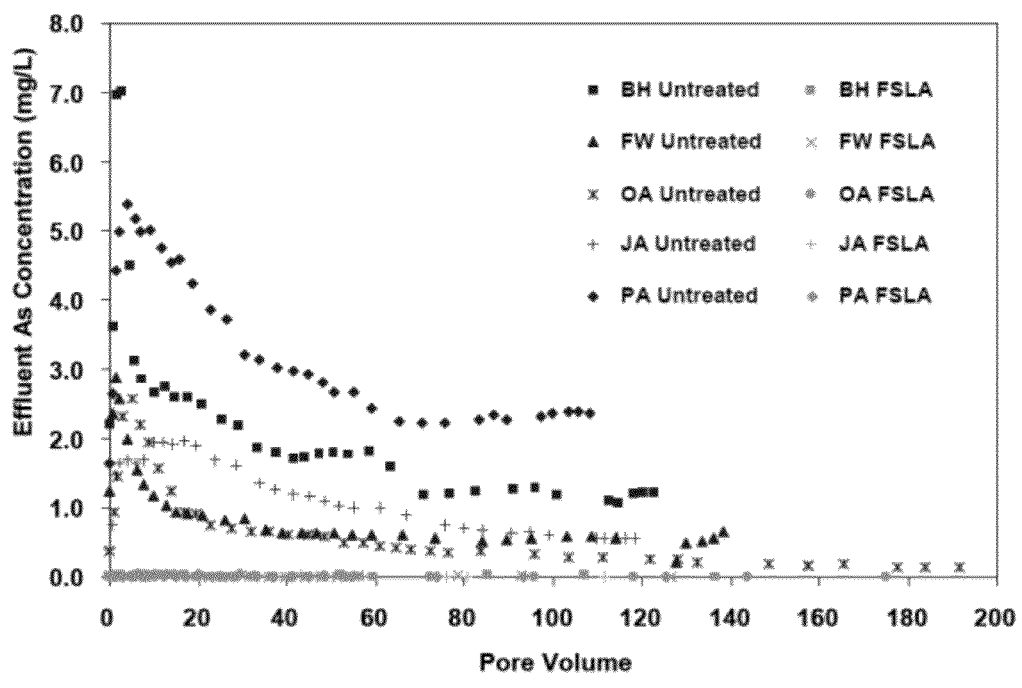
FIG. 2 illustrates the effectiveness of treating a variety of arsenic-contaminated soils with a solution of ferrous sulfate and lanthanum chloride.

By way of explanation, the data of FIG. 1 are collected as a ferrous sulfate solution is passed through a column of arsenic-contaminated soil. As saturation of the column with iron hydroxide is achieved and iron concentrations stabilize, arsenic concentrations decline to non-detectable levels. Thus, the experimental data indicate that treating arsenic-contaminated soils with ferrous sulfate can reduce or eliminate arsenic leaching from the soil. FIG. 2 illustrates the effectiveness of a ferrous sulfate reagent that also contains lanthanum chloride on a variety of soil samples. Any data point above 0.0 mg/L on the y-axis indicate arsenic concentrations leached with increasing pore volumes from contaminated soils, whereas any data point located on the x-axis (corresponding to 0.0 mg/L) represent leaching from soils treated with ferrous sulfate and lanthanum chloride. The results indicate that the combination of ferrous sulfate and lanthanum chloride reduced or eliminated leaching of arsenic from contaminated soils.

FIG. 3 illustrates the long term effectiveness of ISCF using a synthetic precipitation leaching procedure (SPLP) on untreated arsenic-contaminated soil (referred to as "BHC1") and arsenic-contaminated soil treated with ferrous sulfate (referred to as "BCH3-$FeSO_4$"). The data indicate that after about 1300 hours of laboratory leaching, simulating more than 280 years of natural leaching, treated soil leaches no detectable arsenic whereas untreated soil continues to leach arsenic. FIG. 4 illustrates the ability of ferrous sulfate treatment to eliminate arsenic leaching from contaminated soils during alternating periods of wetting and drying, simulating periodic rainfall. As shown by the data, the untreated soils leach arsenic when re-wetted, mobilizing environmentally available arsenic. Treating soils with ferrous sulfate immobilizes arsenic in the soil, even after periods of drying.

Thus, as used herein, the phrase "immobilizing a contaminant" refers to substantial reduction in the ability of the contaminant to be leached from the medium so that the contaminant is substantially fixed or immobilized in the medium. The immobilizing of the contaminant can occur by adsorption of the contaminant, incorporation of the contaminant into a crystalline lattice, precipitation, co-precipitation, combinations thereof, and the like. Further, according to the various embodiments of the present invention, immobilization of the contaminant in the medium does not involve degradation of the contaminant by the chemical reagent and does not involve extraction of the immobilized contaminant from the medium.

The chemical reagent can be used in combination with other compounds that can improve its ability to immobilize the contaminants. These additional compounds, which are referred to herein as chemical additives, can be selected based on the contaminant(s) and on the conditions of the contaminated medium (e.g., whether the medium provides oxidizing or reducing conditions, is acidic or basic, or the like). These chemical additives can include chelating agents, pH-modifying chemicals (e.g., inorganic or organic acids, bases, and/or buffers), adsorbents, precipitants, surfactants, surface-tension altering agents, porosity modifying agents, and/or permeability-modifying agents. Specific examples of such chemical additives for certain embodiments of the present invention include sulfur, a sulfur-containing organic compound, oxygen, phosphoric acid, combinations thereof, and the like.

Once the chemical system (i.e., the chemical reagent and the optional additional compounds) has been selected and prepared, it can be contacted with the contaminated medium. The contacting can be achieved by placing the chemical system in or on a contaminated medium in such a manner as to interact with the contaminant in the medium to produce a more benign species. In some embodiments, the chemical system can be delivered to the contaminated medium by injection through direct push methods (as shown in FIG. 6), injection through a drilled borehole or well, infiltration by a liquid or solid applied at the surface, injection through a horizontal well, irrigation, infiltration through a horizontal or vertical treatment zone, or combinations thereof, among other methods known in the art. Application of the chemical reagent does not significantly reduce soil permeability, allowing soil pore spaces to remain open. Further, the various embodiments of the systems and methods of the present invention do not involve exogenous mixing (e.g., physical or mechanical mixing of the medium and the chemical reagent) beyond the mixing that may be attributed to the flow of the chemical reagent into or through the medium.

Figure 8:
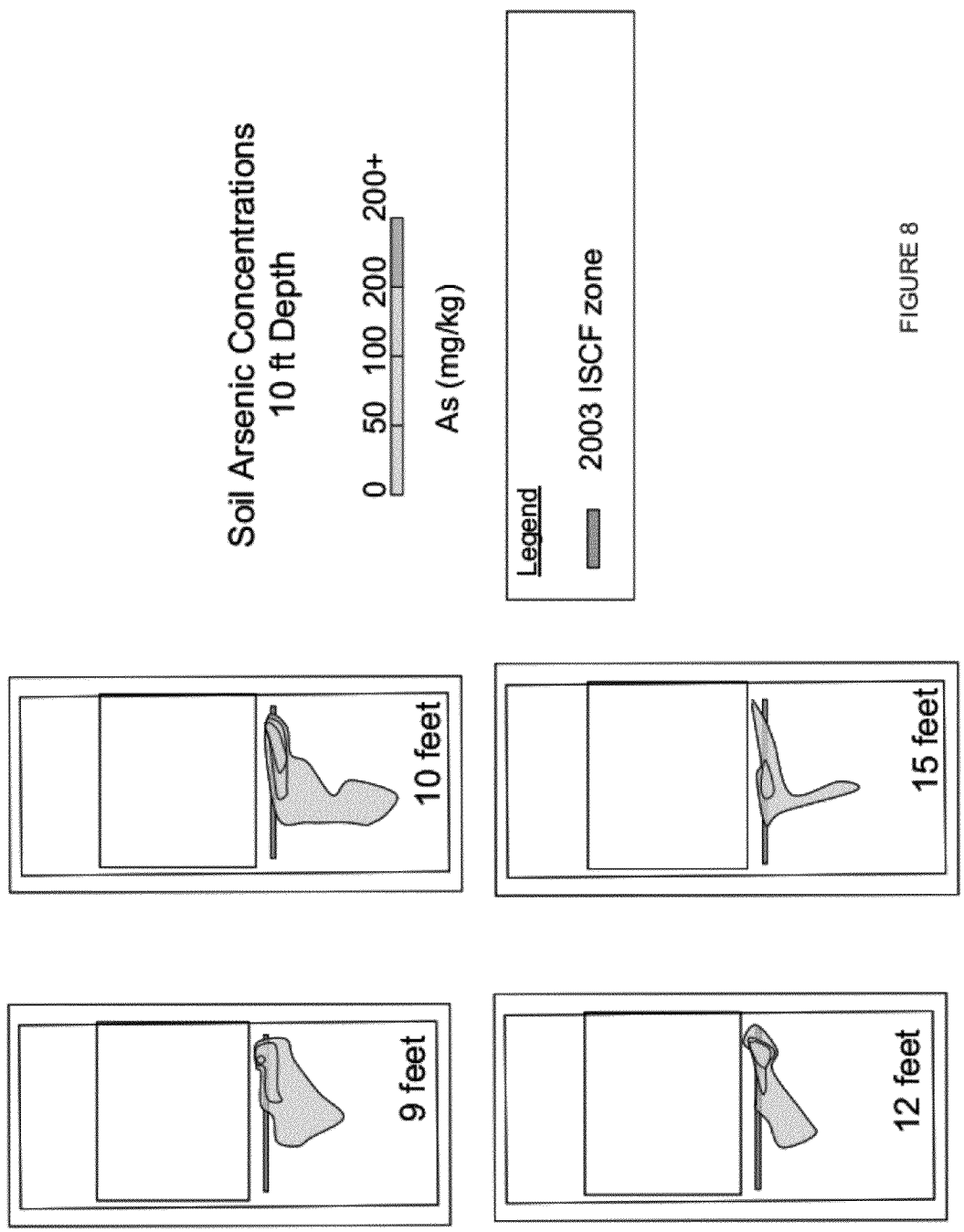
FIG. 8 illustrates saturated zone contaminant capture delineation at 9, 10, 12, and 15 feet after an in-situ ferrous sulfate treatment.

Field data indicate this technology is effective under both oxidizing (FIGS. 7A-B) and reducing conditions (FIG. 8). More specifically, FIG. 7A illustrates an in-situ chemical fixation (ISCF) unsaturated zone treatment area, showing up-gradient (LPZ-3) and down-gradient (LPZ-2) wells. FIG. 7B illustrates arsenic concentrations in both wells were similar prior to treatment, but, in this example, treatment under oxidizing conditions resulted in decreased concentrations in the down-gradient well relative to the up-gradient well. The difference between up-gradient and down-gradient concentrations are generally an order of magnitude (about 0.1 to 0.01 mg/L, respectively), which results in the down-gradient well falling below the drinking water standard for arsenic after treatment. FIG. 8 illustrates saturated zone contaminant capture delineation at 9, 10, 12, and 15 feet after in-situ ferrous sulfate treatment under reducing conditions.

Figure 9:
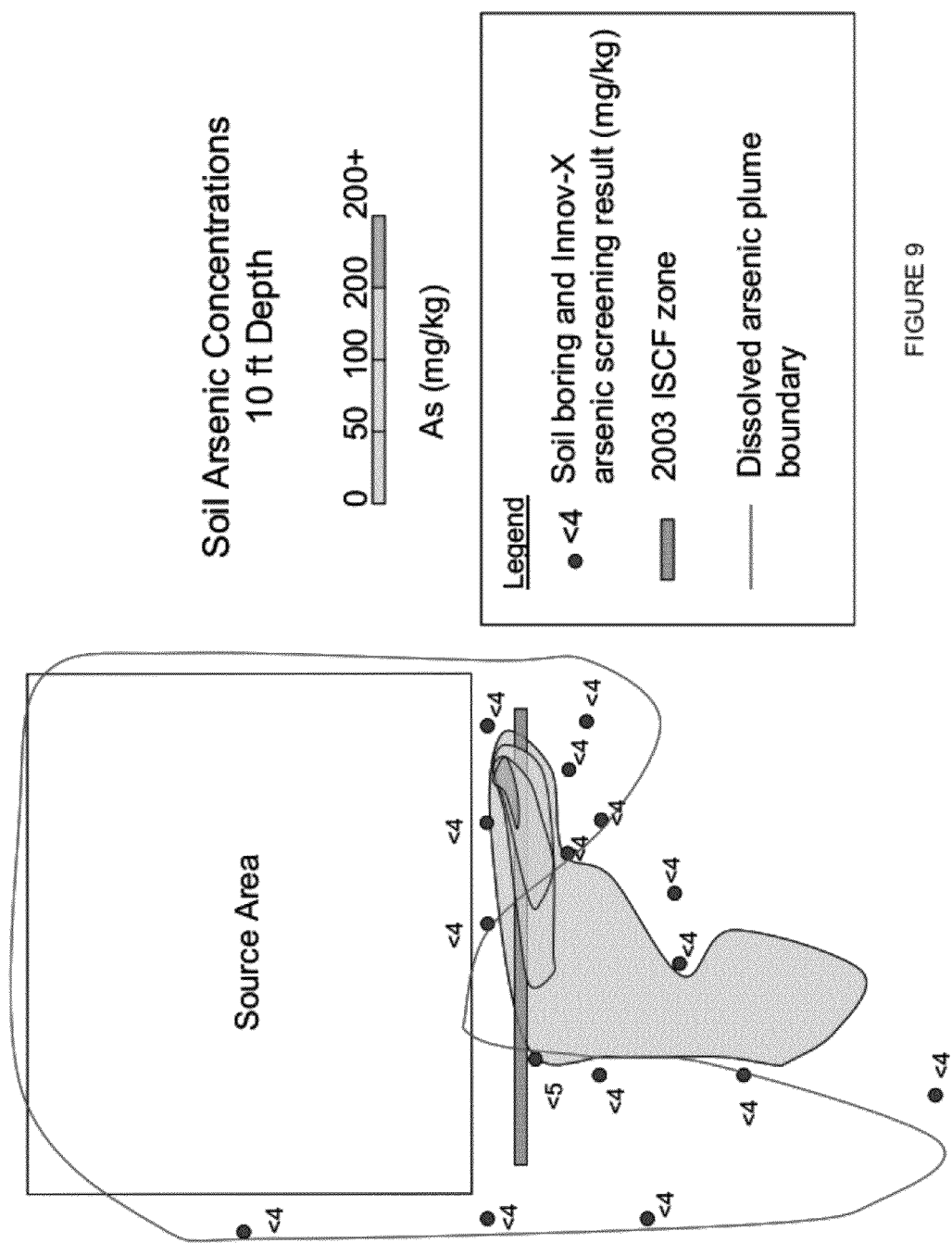
FIG. 9 illustrates the accumulation of arsenic onto aquifer solids near to, and down-gradient from, ISCF saturated zone treatment.

In one embodiment, soils above the water table (unsaturated zone soils) are treated in-situ to prevent leaching of contaminants to groundwater. Iron oxidation produces iron oxides and/or hydroxides upon which the contaminant adsorbs. In another embodiment, groundwater is treated in-situ by injecting iron compounds (FIG. 9). FIG. 9 illustrates the accumulation of arsenic onto aquifer solids near to, and down-gradient from, ISCF saturated zone treatment. FIG. 9 indicates that increased accumulation of arsenic onto aquifer solids results in low dissolved arsenic concentrations in groundwater. In shaded area 1, arsenic has accumulated due to the treatment described herein. High groundwater arsenic concentrations of area 2 are generally absent in the area influenced by the treatment described herein. Under oxidizing groundwater conditions, iron oxidation produces iron oxides and/or hydroxides upon which the contaminant adsorbs. The contaminant may also co-precipitate with the iron oxides and/or hydroxides as they form. The contaminant-containing iron oxide particles adhere to the soil, resulting in treated groundwater.

Oxides and hydroxides formed in-situ from the chemical system are effective and permanent under oxidizing conditions. Other methods, such as the creation of pyrite, apatite, and/or other minerals are effective under reducing conditions.

In some embodiments, soil flushing and multi-zone treatments can be implemented to create an effective in-situ treatment train (FIG. 10) along with the systems, methods, and improved chemistries of the present invention. Soil flushing is described in commonly owned U.S. Pat. No. 6,210,078 B1 and Canadian Patent No. 2,307,961, the contents of which are incorporated by reference in their entireties as if fully set forth below.

Soil flushing can be performed to remove contaminants from contaminated soil. An extraction well or wells may be installed in the soil flushing zone to remove contaminated groundwater. A zone to capture or neutralize excess soil flushing agent may be developed down-gradient of the soil flushing zone. An in-situ chemical fixation zone is then developed at the end of the treatment train to immobilize any residual contamination. Any of these steps could be used singly, or in series. It should be readily understood by a person of ordinary skill in the art that the treatment zones can be implemented horizontally, vertically, or in any geometry amenable to site conditions. Further, the number of zones is dictated by the specific contaminant, and multiple zones in series might be employed.

Figure 10:
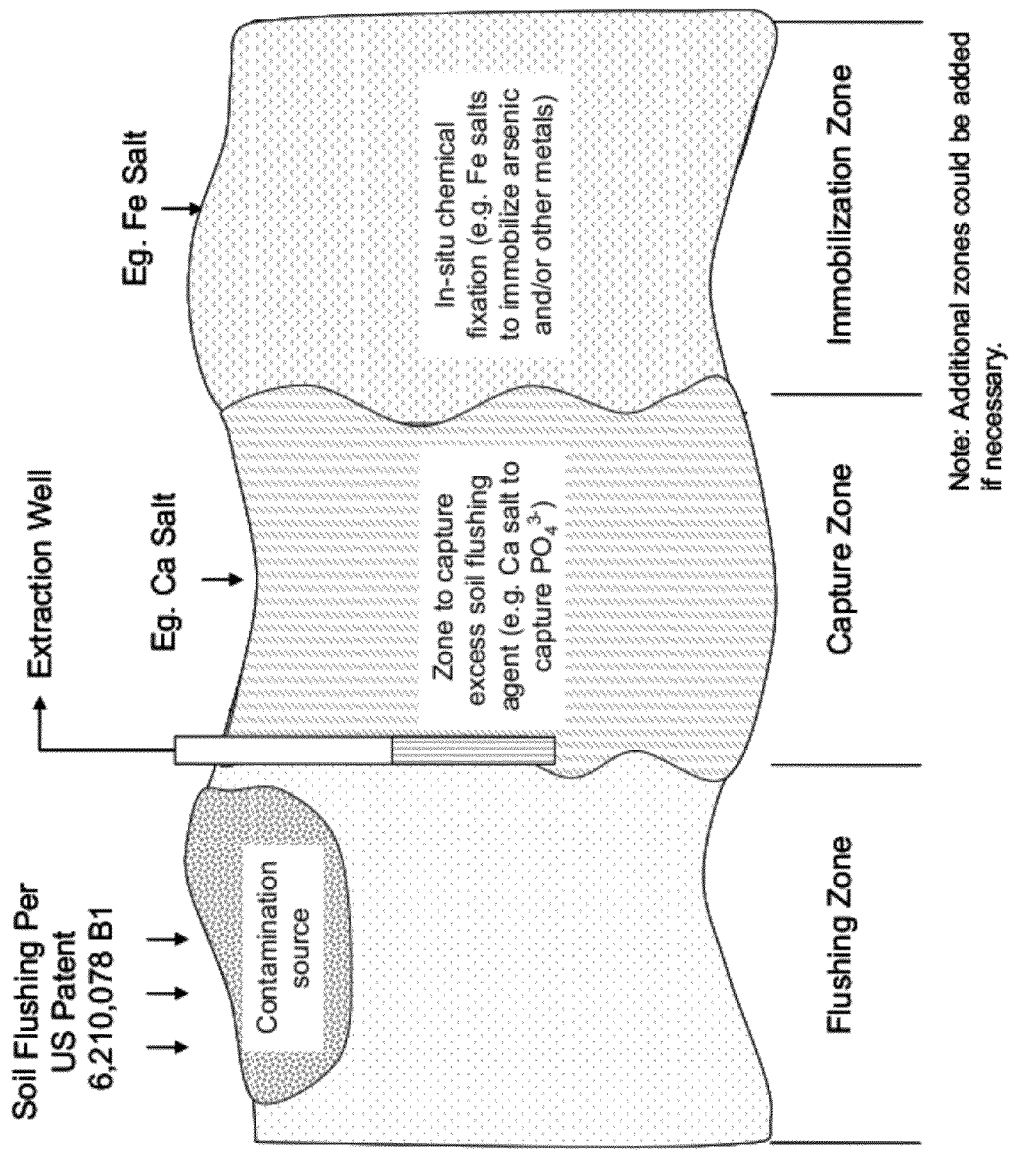
FIG. 10 illustrates a horizontal multi-zone in-situ treatment train.

By way of example, FIG. 10 illustrates an in-situ treatment train through a multi-zone treatment method. In the first zone, soil flushing is performed to remove contamination from the soil. A zone to capture or neutralize excess soil flushing agent may be developed down-gradient of the flushing zone if needed. An in-situ chemical fixation (ISCF) zone is then developed at the end of the treatment train to immobilize any residual contamination. Though depicted horizontally in FIG. 10, the zones could be applied vertically (FIG. 11) or in any geometry amenable to site conditions.

By way of another example, FIG. 11 illustrates the variety of mechanisms by which a contaminant can be immobilized. In the Figure, arsenic is used as the contaminant and ferrous sulfate is used as the chemical reagent. Fixation mechanisms in an aerobic environment such as the soil vadose zone may differ from fixation mechanisms in an anaerobic environment such as beneath the groundwater table.

The necessary chemicals may be introduced at the surface, or through wells or other subsurface devices or mechanisms. As stated above, chemicals introduced into the one or more zones can include chelating agents, pH-modifying agents (e.g., inorganic or organic acids, bases, and/or buffers), adsorbents, precipitants, surfactants, surface-tension altering agents, porosity-modifying agents, and/or permeability-modifying agents. It is also possible to create different conditions in various zones. For example, pH manipulation and/or redox manipulation could be performed in one or more zones.

In an embodiment of the present invention, the flushing agent can comprise a Lewis acid, a Lewis base, a Bronsted acid, a Bronsted base, or a combination thereof. In an exemplary embodiment, soil flushing with dilute phosphoric acid is performed to mobilize arsenic from the soil, as shown in FIG. 10. Contaminated water is collected immediately down-gradient of the source or contaminated zone. Calcium salts are then introduced down-gradient of the flushing zone to capture excess phosphate as $Ca_3(PO_4)_2$. ISCF is then performed with ferrous sulfate in a third zone to capture any arsenic escaping from the flushing zone and/or capture zone. Additional zones might be used, depending on the contaminant and site characteristics.

The addition of lanthanum chloride to ferrous sulfate solution at a weight-based ratio of 322 mg of Fe to 391 mg of La per kg of water increases treatment effectiveness. Although not wishing to be bound to any particular theory, lanthanum may precipitate as a hydroxide salt and sorb arsenic or may precipitate as lanthanum arsenate.

In saturated conditions (i.e., the groundwater table), precipitated iron hydroxide and immobilized arsenic will be most stable when dissolved carbon dioxide concentrations are less than 100 times atmospheric levels (indicating a lack of iron reducing microbial activity), or when soluble nitrate is present (indicating a preferred electron acceptor for microbial metabolism, rather than ferric iron). Thus, to stabilize ferric hydroxide precipitates and immobilized arsenic, nitrate can be added to function as a preferred electron acceptor for microbial metabolism, rather than ferric iron.

All patents, patent applications and references included herein are specifically incorporated by reference in their entireties.

It should be understood, of course, that the foregoing relates only to exemplary embodiments of the present invention and that numerous modifications or alterations may be made therein without departing from the spirit and the scope of the invention as set forth in this disclosure.

The present invention is further illustrated by way of the examples contained herein, which are provided for clarity of understanding. The exemplary embodiments should not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Therefore, while embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

EXAMPLES

Example 1

Pre-Treatment Soil Characterization

The arsenic-contaminated soil samples are all composed predominantly of sand-sized quartz grains with variable amounts of organic matter and fine-grained inorganic material. Total recoverable element concentrations from the <2 mm fraction of the soil (extracted by microwave assisted acid digestion according to U.S. EPA Method 3051 and analyzed by inductively coupled plasma-optical emission spectroscopy (ICP-OES)) are shown in Table 1 in units of mg/kg.

TABLE 1

| | Soil | | | | |
|---|---|---|---|---|---|
| Element | BH | FW | OA | JA | PA |
| As | 216 | 117 | 47 | 148 | 316 |
| Al | 3502 | 2911 | 738 | 2937 | 11118 |
| Ca | 11859 | 9605 | 214 | 657 | 26291 |
| Fe | 721 | 719 | 412 | 1430 | 16431 |
| Mg | 2265 | 1923 | 47 | 127 | 4152 |
| K | 294 | 93 | 3 | 56 | 1305 |
| Na | 157 | 117 | 0 | — | — |
| Zn | 24 | 44 | 28 | 41 | 428 |
| Cu | 34 | 22 | 7 | 7 | 273 |
| Ba | 27 | 24 | 4 | 14 | 100 |
| Ti | 62 | 58 | 20 | 49 | 315 |
| Sr | 18 | 18 | 2 | 3 | 39 |
| Mn | 110 | 37 | 1 | 11 | 411 |
| Pb | 14 | 6 | 8 | 11 | 57 |

*Units in mg/kg.

Bulk soil mineralogy was determined by powder X-ray diffraction analysis. Powder XRD analysis was also performed on <2 μm clay-sized particles separated according to Stoke's Law from the studied soils. The mineralogy and other basic characteristics of the five tested soils are listed below in Table 2.

TABLE 2

| | BH | FW | OA | JA | PA |
|---|---|---|---|---|---|
| pH | 8.40 | 9.25 | 6.78 | 6.62 | 7.94 |
| Soil texture | Sandy clay loam | Sandy loam | Sand | Sand | Sandy loam |
| Color | Medium dark | Pale yellowish | Yellowish gray | Olive gray (5 Y 4/1) | Pale Brown (5 YR 5/2) |

TABLE 2-continued

|  | BH | FW | OA | JA | PA |
|---|---|---|---|---|---|
|  | gray (N4) | brown (10 YR 6/2) | (5 Y 8/1) |  |  |
| Crystalline phases | Qtz*, Glnt, Clct | Qtz, Glnt, Clct | Qtz | Qtz | Qtz, Glnt, Clct, Mc, An |
| Clay minerals | Kaol, Cli, Mm, Ms | Kaol, Cli | Cli | Cli | Kaol, Ms |

*Qtz: quartz [$SiO_2$]; Glnt: gehlenite [$Ca_2Al(AlSi)O_7$]; Clct: calcite [$CaCO_3$]; Mc: microcline [$KAlSi_3O_8$]; An: anorthite [$CaAl_2Si_2O_8$]; Kaol: kaolinite [$Al_2Si_2O_5(OH)_4$]; Cli: clinochlore [$Mg_5Al(Si_3Al)O_{10}(OH)_8$]; Mm: Montmorillonite [$Ca_{0.2}(Al, Mg)_2Si_4O_{10}(OH)_2 \cdot 4H_2O$]; Ms: Muscovite [$KA_{l2}Si_3AlO_{10}(OH)_2$]

Example 2

Batch Treatment Experiments

Methods. All arsenic contaminated soils were treated using two different reagents: ferrous sulfate (FS) and lanthanum-modified ferrous sulfate treatment (FSLA). Detailed procedures of these treatments are described below.

Ferrous Sulfate Treatment. Due to the low toxicity of iron and the fact that iron is significantly retarded by the soil samples, the iron concentration within the treatment solution was set to be the solubility limit of iron oxyhydroxide (~322 ppm Fe). For treatment, 150 g of each of the five soil samples were put into contact with 450 g FS solution (0.72 g $FeSO_4 \cdot 7H_2O$ in 450 g DDI water) in 1 L bottles. The mixtures were put on a shaker table at 200 rpm for 7 days. After treatment, samples were centrifuged at 7000 rpm for 15 minutes. The supernatant solutions were removed, filtered through 0.2 µm nylon syringe filters and acidified to 2% $HNO_3$ using Optima® ultra-pure nitric acid. The supernatant solutions were analyzed by ICP-OES.

Lanthanum Modified Ferrous Sulfate Treatment. $LaCl_3$ was added to the original FS treatment solution with the thought that it would make the treated soil more durable to environmental change and natural leaching. The concentration of La in the treatment solution was set at a 1:2 As to La molar ratio, according to the soil sample with the highest As concentration (PA soil). The FSLA treatment solution therefore contained 322 ppm Fe and 391 ppm La (1.20 g $FeSO_4 \cdot 7H_2O$ and 0.777 g of $LaCl_3 \cdot 7H_2O$ in 750 g DDI water). The same soil to treatment solution ratio, treatment time, sample preparation and analytical methods described above were used for these experiments.

Sequential chemical extraction. A 7-step sequential chemical extraction procedure described by Leleyter and Probst (1999) was performed upon the untreated and the treated soils to differentiate trace elements associated with the following fractions: (1) water soluble; (2) exchangeable; (3) acid soluble, bound to carbonates; (4) easily reducible, bound to Mn oxides; (5) moderately reducible, bound to amorphous oxides; (6) poorly reducible, bound to crystalline oxides and (7) oxidizable, bound to organic matter and sulfides. The results of the sequential chemical extraction are plotted in FIG. 12.

Figure 12:
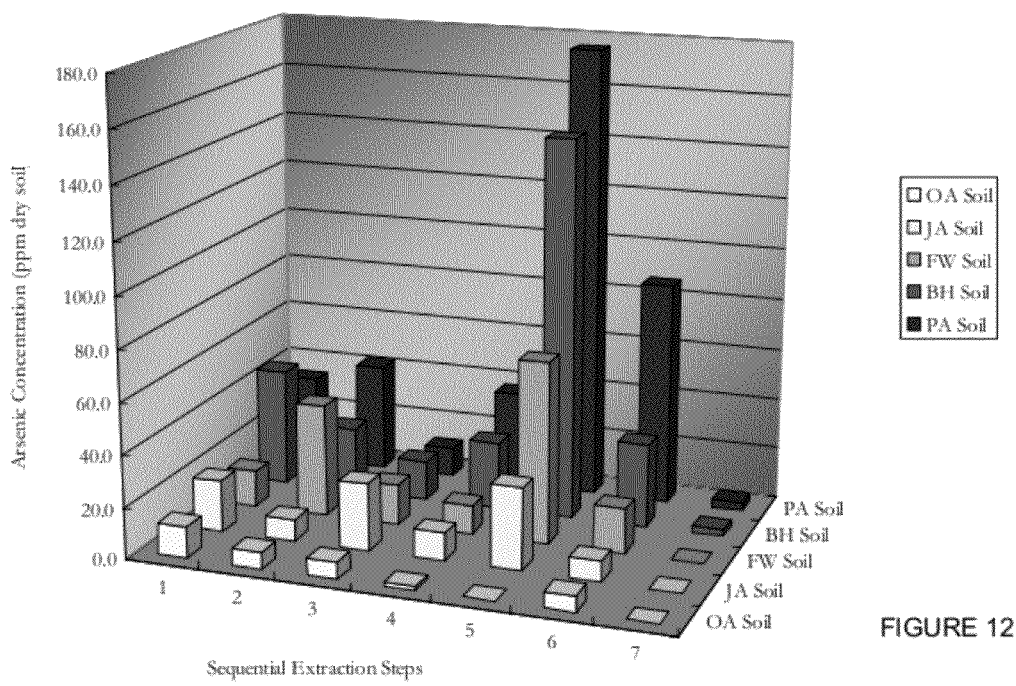
FIG. 12 illustrates arsenic distribution among the 7 extraction steps in untreated soils.

As shown in FIG. 12, extraction step 5 (arsenic largely bound to amorphous Fe oxides) usually represents the fraction containing the highest amount of arsenic in all of the untreated soils, with the exception of OA soil which is predominantly sand and has the lowest iron concentration. No soil shows substantial arsenic in sulfides or organic matter (step 7). The data show that even after four decades of natural precipitation leaching, a significant amount of arsenic is still present in the soluble and exchangeable phase (steps 1 and 2).

Figure 13:
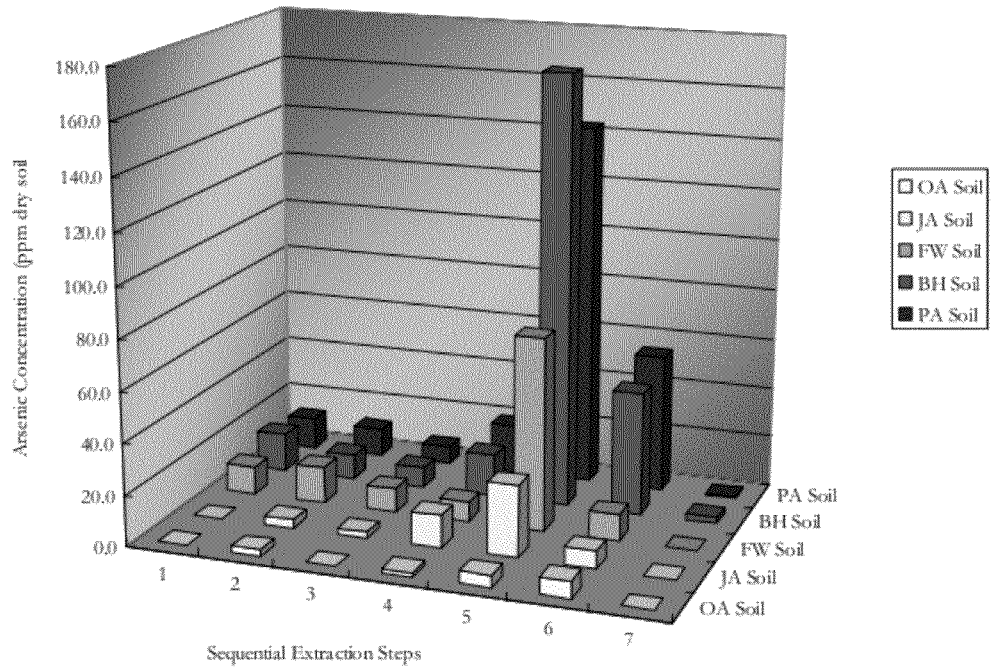
FIG. 13 illustrates arsenic distribution among the 7 extraction steps in FS treated soils, demonstrating the movement of arsenic to less leachable phases.

The addition of iron from FS treatment has changed the arsenic distributions in the FS-treated soils, moving arsenic from more soluble to less soluble fractions (c.f., FIG. 13). All five soils contained very little oxidizable arsenic (step 7: bound to organic and sulfides) originally, so the treatment did not make any significant difference for this fraction. However, the arsenic distribution among the remaining extraction steps was clearly affected by the treatment. Regardless of the initial arsenic distribution, a significant amount of arsenic was transferred from mobile fractions (water soluble, exchangeable, and acid soluble) to more recalcitrant fractions (moderately reducible and poorly reducible) due to the treatment. In this 7-step sequential chemical extraction procedure, arsenic generally is less available for leaching in each successive fraction from step 1 through step 6 for an oxidizing environment. Consequently, this phase transfer of arsenic through the FS treatment process facilitates the chemical fixation of arsenic in contaminated soils.

Figure 14:
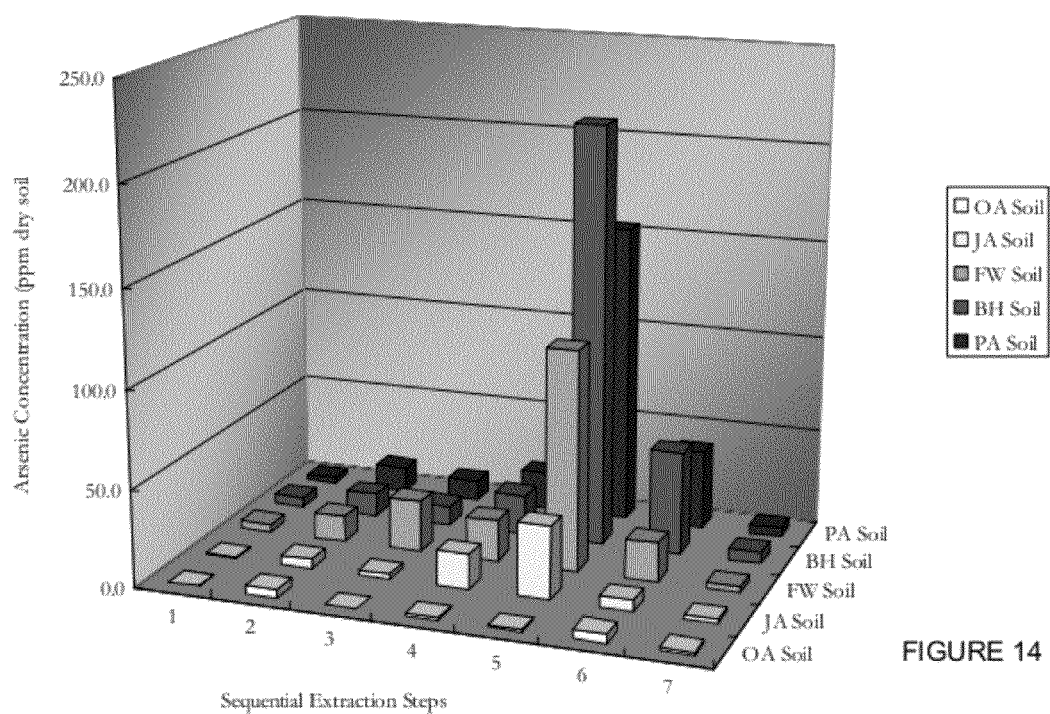
FIG. 14 illustrates arsenic distribution among the 7 extraction steps in FSLA treated soils, demonstrating the movement of arsenic to less leachable phases.

Similar sequential chemical extraction patterns can be observed for the FSLA-treated soils as for the FS-treated soils (FIG. 14). For each soil, a large portion of the total soil arsenic was transferred from the easily accessible soil fractions to iron oxide phases. Compared to the FS-treated soils, FSLA treatment achieved better fixation of the step 1 arsenic in the untreated soils presumably because the lanthanum in the aqueous phase scavenged free arsenic left by the FS treatment. FSLA treatment appears to be the best among the three treatment methods, as can be verified by the SPLP sequential leaching experiments described below.

Leaching tests (SPLP). A sequential leaching procedure was designed to simulate the leaching effect of natural precipitation. The synthetic acid rain solution described in the EPA Method 1312B SPLP test (US EPA, 1994a) was used as the leachant. Sequential leaching was performed on the five contaminated soils for baseline evaluation, and also on the soils treated by the three methods discussed previously. The three treatment methods were compared against each other and with the untreated soils to evaluate their efficacy in immobilizing the arsenic present in the soils.

The SPLP fluid is a dilute mixture of sulfuric and nitric acids having a pH of 4.20. The leaching of soil samples was performed by placing 3 g of homogenized soil and 45 ml of SPLP solution into a 50 ml centrifuge tube. The tube was capped and shaken for 24 hrs on a shaker table at 200 rpm, then centrifuged for 30 minutes at 3000 rpm. After centrifugation, the supernatant solution was removed, another 45 ml of the leachate fluid was added to the residue, and the samples were subjected to another 24 hrs of leaching. Each successive leachate was filtered, acidified and analyzed by ICP-OES.

Figure 15A:
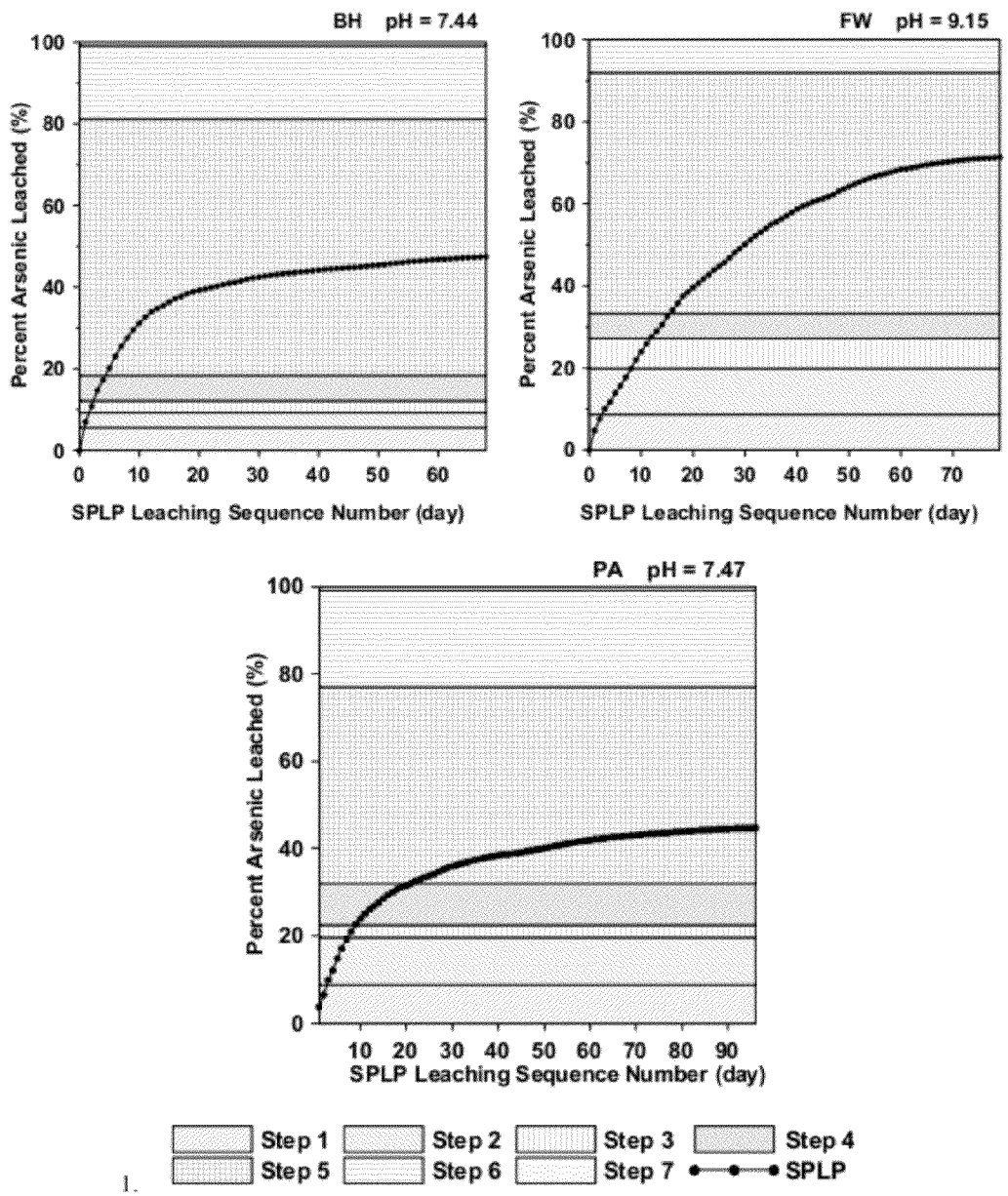
FIG. 15A illustrates a comparison of arsenic cumulatively extracted by sequential chemical extraction and SPLP sequential leaching in soil samples BH, FW and PA.
Figure 15B:
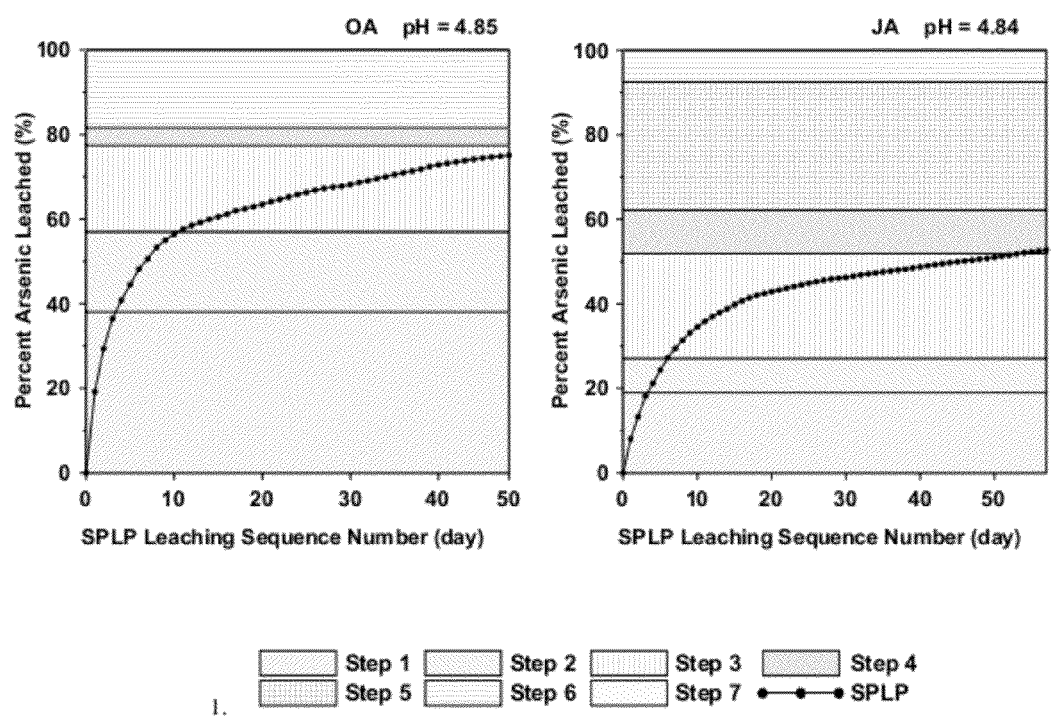
FIG. 15B illustrates a comparison of arsenic cumulatively extracted by sequential chemical extraction and SPLP sequential leaching in soil samples OA and JA.

FIGS. 15A and 15B show the sequential leaching results for the five untreated soils. In FIGS. 15A and 15B, the seven different patterns illustrate the distribution of arsenic between the following soil fractions: (1) water soluble; (2) exchangeable; (3) acid soluble, bound to carbonates; (4) easily reducible, bound to Mn oxides; (5) moderately reducible, bound to amorphous Fe oxides; (6) poorly reducible, bound to crystalline Fe oxides and (7) oxidizable, bound to organic matter and sulfides. The cumulative amount of arsenic sequentially leached by the SPLP solution is shown by the dotted lines. Average pH values of the SPLP leachates for the soils are shown above each plot. The cumulative arsenic percentage leached by the SPLP solution was plotted against the sequential chemical extraction results. All five untreated soils showed fast initial arsenic release followed by prolonged gradual discharge. According to FIGS. 15A and 15B, the five soils under investigation can be grouped into two categories. Due to the lack of calcareous phases, OA and JA soils promptly lost their buffer capacity after reaction with the weakly acidic SPLP leachant. The pH of OA and JA sequential leachate solutions quickly dropped from near 7 to under 5 (FIG. 15B). On the other hand, abundant calcareous phases caused the leachate from BH, FW and PA soils to remain basic (FIG. 15A).

Results and Conclusions. Arsenic-contaminated soils from BH, FW, OA, JA and PA sites were treated with two different reagents (FS and FSLA) in order to achieve arsenic immobilization. In the FS treatment method, ferrous sulfate was applied to the soils so that the resultant iron hydroxides will sorb arsenic. The FSLA treatment method uses both ferrous sulfate and lanthanum chloride additions.

The efficacy of these three methods was evaluated through sequential chemical extraction and SPLP sequential leaching of the treated and untreated soils. The sequential chemical extraction results show that the addition of iron from FS treatment shifted the arsenic distribution in the soil from more leachable to less leachable fractions. A significant amount of arsenic was moved from the water soluble, exchangeable, and acid soluble soil fractions to the moderately reducible and poorly reducible fractions by the treatment. Consequently, this transfer of arsenic to less mobile fractions by the FS treatment facilitates the chemical fixation of arsenic in contaminated soils. Compared to the FS-treated soils, FSLA treatment achieved better fixation for the water soluble arsenic in the untreated soils—presumably because the lanthanum in the aqueous phase scavenged soluble arsenic left by FS treatment. FSLA treatment appears to be the best among the three treatment methods, as can be verified by the SPLP sequential leaching test.

Example 3

Column Experiments

Column experiments were performed to evaluate the arsenic fixation methods under conditions better simulating those at the field sites. Based on their performance in the batch experiments, the FS and FSLA treatment methods were selected to undergo the further experimental evaluation in column format. The five contaminated soils were treated with the FS and FSLA solutions until breakthrough was achieved, then leached with synthetic acid rain solution to simulate natural leaching. Untreated soil columns were also leached with the SPLP solution to establish baseline arsenic leaching behavior for comparison Methods. Soil samples were packed into Plexiglas® columns, 4 inches in diameter and 16 inches long. Table 3 lists the experimental conditions used for the column studies. Before treatment, the packed soil columns were slowly saturated with doubly deionized (DDI) water from the bottom to the top, in order to expel air inside of the columns and to measure pore volume.

TABLE 3

|  | BH | FW | OA | JA | PA |
| --- | --- | --- | --- | --- | --- |
| Soil Mass (kg) | 4.005 | 4.211 | 4.125 | 4.221 | 4.255 |
| Porosity | 0.325 | 0.350 | 0.331 | 0.364 | 0.346 |
| Pore Volume (ml) | 785 | 845 | 800 | 880 | 835 |

Figure 18:
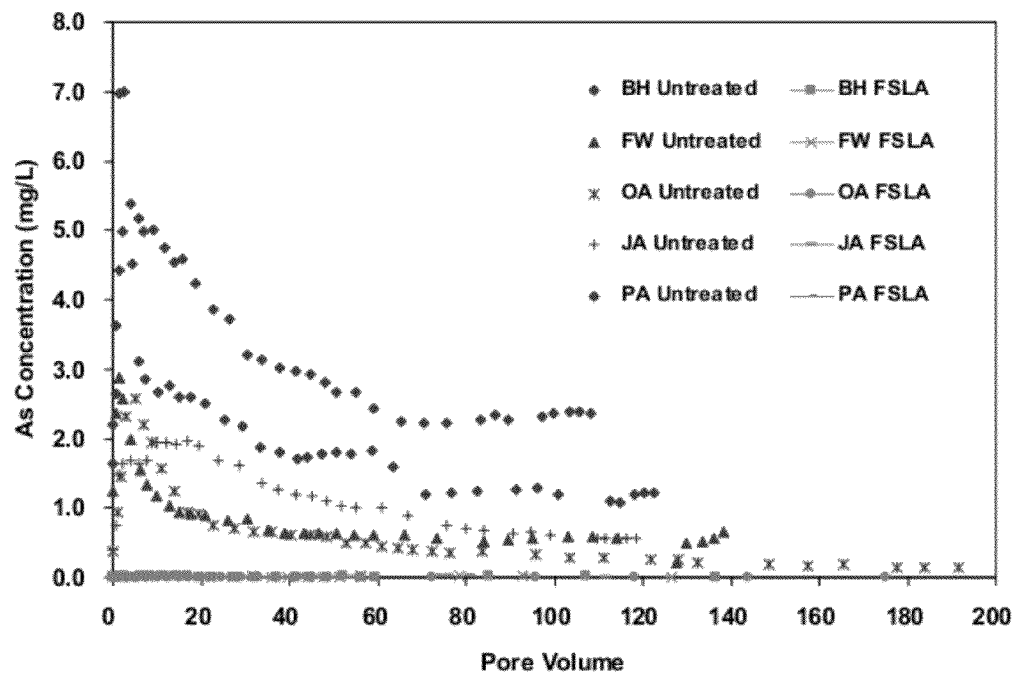
FIG. 18 illustrates leachate arsenic concentrations for the FSLA-treated and untreated soil columns during SPLP leaching.

Then, either FS or FSLA solutions were pumped through the columns to perform the soil treatment. A variety of treatment schemes were examined for different soil columns FIG. 18 shows the two different fluid flow arrangements used in the column experiments: (a) saturated flow and (b) unsaturated flow. The average flow rate for both arrangements was controlled at 1.3 ml/min. The treatment process was considered complete after the column effluent iron concentration reached breakthrough. After allowing the treatment solution to drain from the column for 3 days, the SPLP solution was used to leach the treated and untreated columns in the unsaturated flow set-up to simulate the natural precipitation infiltration. Leaching was continued until the effluent arsenic concentration dropped below the ICP-OES LOD.

Short-term experiments. Subsurface response caused by treatment solution infiltration was evaluated by short-term column experiments. FS and FSLA treatment solutions were driven through the soil columns using multi-channel high precision pumps to simulate the field injection conditions. The effluent samples were collected at the outlet end of each soil column. Flow parameters used in these experiments are listed in Table 4.

TABLE 4

|  | BH | FW | OA | JA | PA |
| --- | --- | --- | --- | --- | --- |
| FS treatment flow mode (duration) | Unsaturated (0-100 d) Saturated (100-125 d) | Unsaturated (0-60 d) Saturated (60-111 d) | Saturated | Saturated | Saturated |
| FS solution concentration (ppm Fe) | 84 (0-12 d) 283 (12-125 d) | 84 (0-60 d) 283 (60-111 d) | 322 | 322 | 322 |
| FSLA treatment flow mode (duration) | Saturated | Saturated | Saturated | Saturated | Saturated |
| FSLA solution concentration (ppm Fe:ppm La) | 322:391 | 322:391 | 322:391 | 322:391 | 322:391 |

Figure 16A:
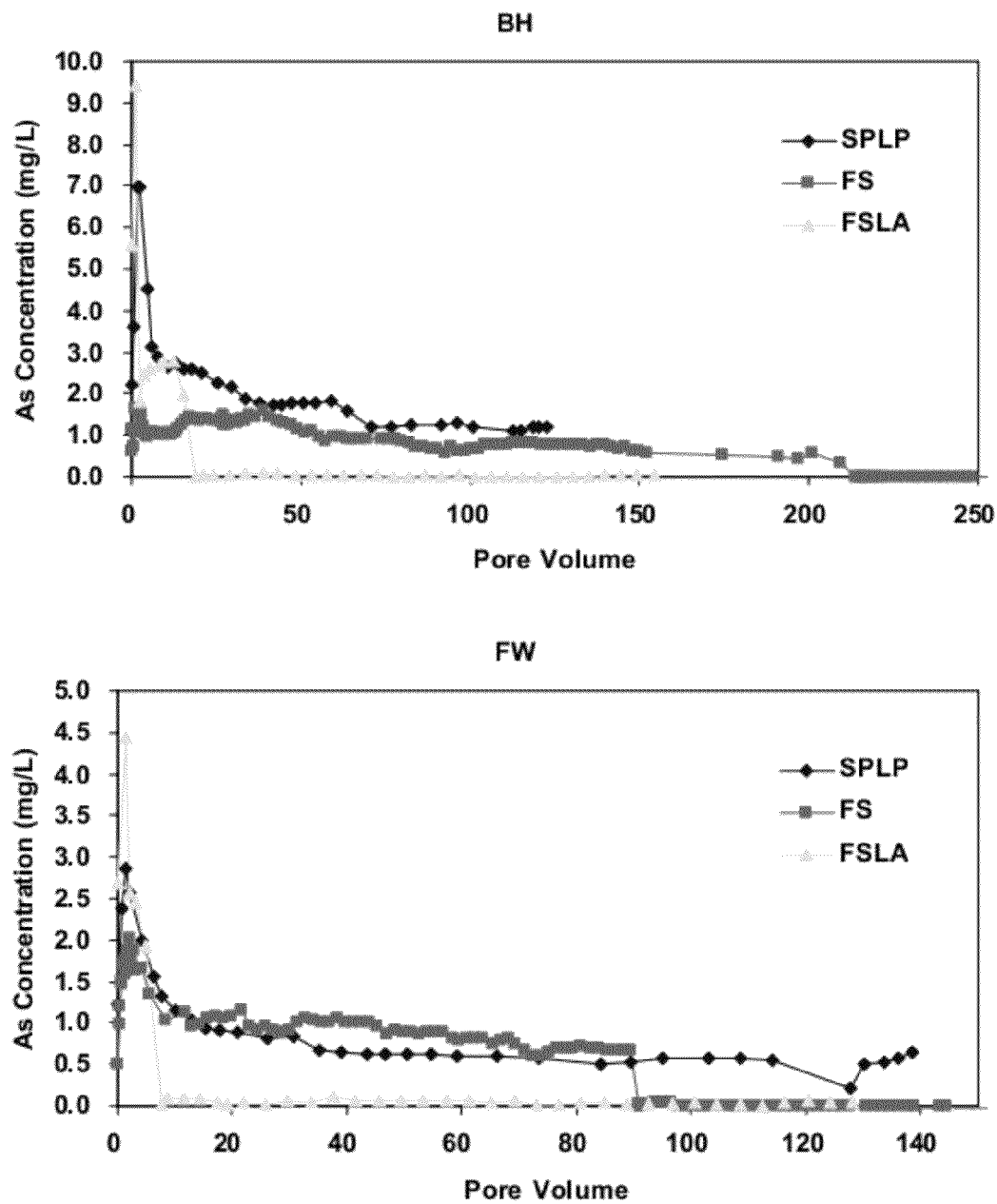
FIG. 16A illustrates a comparison of arsenic concentrations in the column effluents during treatment with those in the untreated column effluents during SPLP leaching (BH and FW).
Figure 16B:
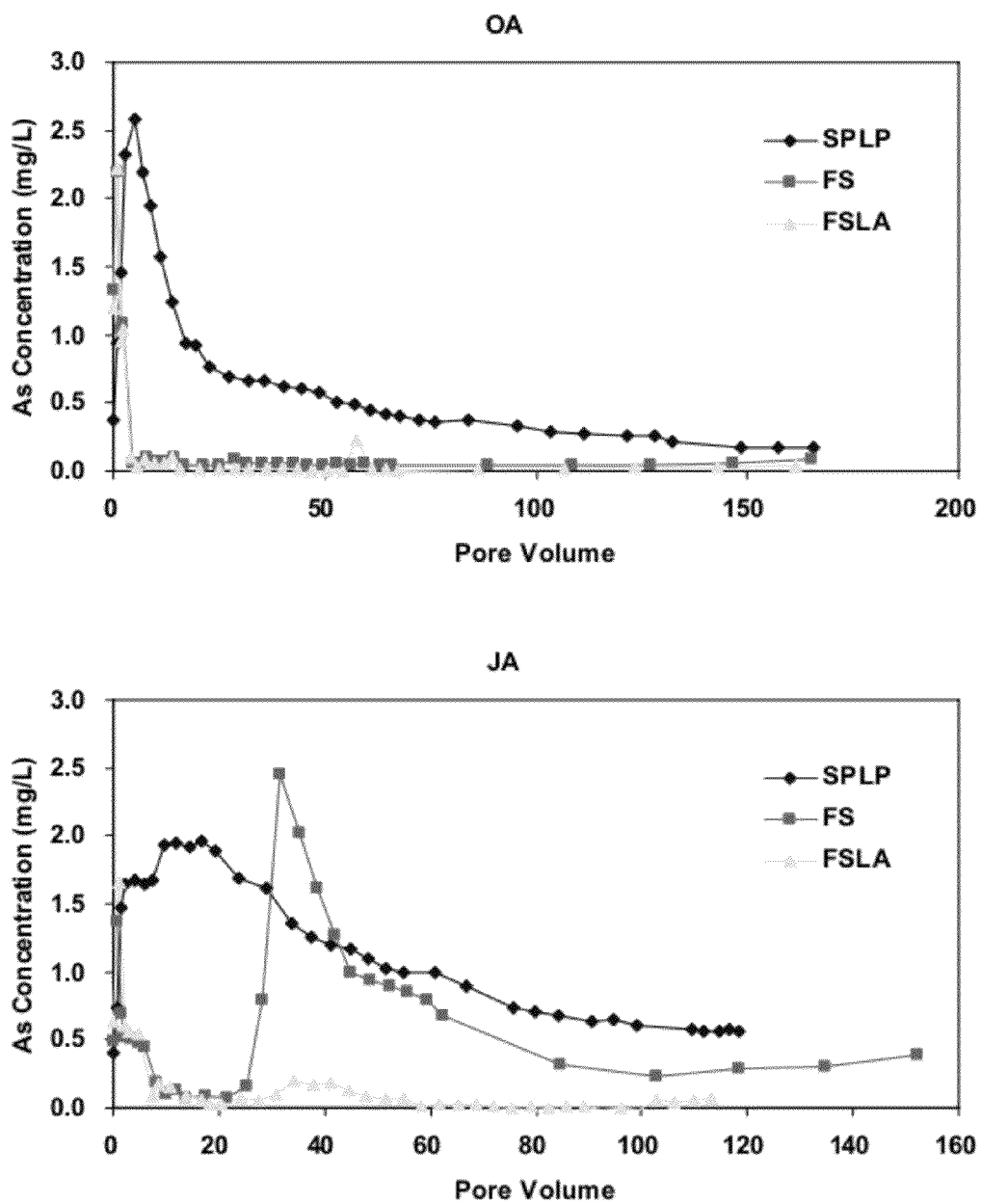
FIG. 16B illustrates a comparison of arsenic concentrations in the column effluents during treatment with those in the untreated column effluents during SPLP leaching (OA and JA).
Figure 16C:
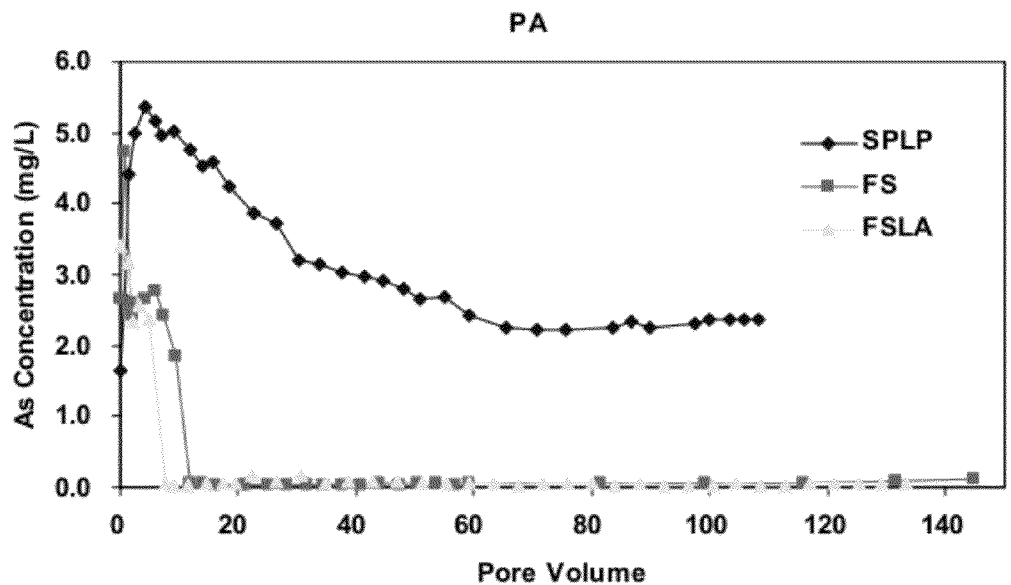
FIG. 16C illustrates a comparison of arsenic concentrations in the column effluents during treatment with those in the untreated column effluents during SPLP leaching (PA).

Arsenic concentrations in the treated soil column leachate are compared against those of the untreated soil column in FIG. 16A-C. The treated soil columns generally leached significantly less arsenic than the corresponding untreated soil. FSLA treatment showed better performance than FS treatment with respect to the overall amount of arsenic released during treatment. However, in BH and FW soil columns, FSLA treatment resulted in an initial As peak that was higher than those of the untreated and FS-treated columns Effluent arsenic concentrations immediately dropped to below the detection limit for all columns after breakthrough. In a field application scenario, treatment agent breakthrough would take less time because of the higher field injection rates as compared to the flow rates used in the column experiments.

The FS and FSLA treatments both released a smaller percentage of the total soil arsenic, compared to that released by the untreated columns during SPLP leaching. Generally, less arsenic was leached during the treatment before iron breakthrough, and no detectable arsenic was present after breakthrough. One exception to this general observation occurred in the FS-treated JA column where a second arsenic peak occurred after iron reached breakthrough. When the acidic treatment solution reached breakthrough, the carbonate-bound arsenic was mobilized but could not be completely adsorbed due to the lack of ferric hydroxide. During FSLA treatment of JA soil, the ubiquitous lanthanum successfully captured this portion of the mobilized arsenic and therefore greatly improved the arsenic fixation performance.

Long-term experiments. The long-term performance of the FS and FSLA treatment methods was evaluated by subjecting the treated soil columns to synthetic acid rain leaching for a large number of pore volumes. Upon the completion of FS and FSLA treatments, the soil columns were drained and left in place for three days to cure before further investigation. Afterward, the SPLP fluid was used to leach all treated columns in unsaturated flow mode to simulate natural precipitation infiltration. The average fluid flow rate was controlled at 1.3 ml/min.

Figure 17:
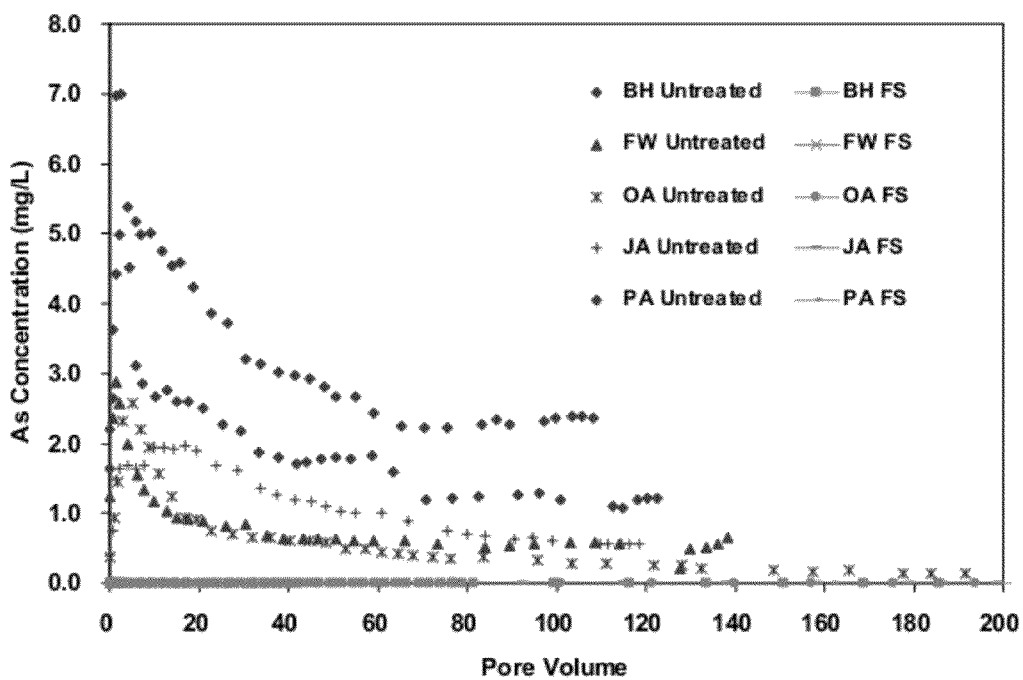
FIG. 17 illustrates leachate arsenic concentrations for the FS-treated and untreated soil columns during SPLP leaching.

FIG. 17 compares leachate arsenic concentrations for FS-treated and untreated soil columns, and FIG. 18 compares those for FSLA-treated and untreated soil columns The FS-treated soil columns were leached with approximately 200 pore volumes of SPLP solution for more than two months; the FSLA-treated columns were leached with 120 pore volumes of SPLP fluid over the same time period. Assuming annual precipitation of 50 inches, a 10% infiltration rate and a three feet thick impacted vadose zone with a porosity of 0.33, 1 pore volume of natural precipitation would take about 2.4 years to pass the impacted zone. Between 120-200 pore volumes of SPLP fluid were pumped through the treated columns to simulate 288-480 years of natural precipitation leaching. FIGS. 22 and 23 demonstrate that none of the treated columns leached out detectable arsenic (>10 µg/L) during the simulated hundreds of years of natural leaching.

Wetting and drying cycles. The soil columns were under continuous saturated flow conditions in the short-term treatment experiments and continuous unsaturated flow conditions during the long-term leaching experiment. However, under natural leaching conditions, the arsenic-impacted soils experience wetting-drying cycles—that is, soils dry between precipitation events. These cycles may affect the physical and chemical properties of the soil which might in turn have an influence on the mobility of the sorbed arsenic. In order to evaluate the possible influence of such wetting and drying cycles on the treated soils, the FS-treated BH and FW soil columns were exposed to a number of laboratory controlled wet-dry cycles. The columns were leached with the SPLP fluid for three days, followed by a drying period when the columns were drained and allowed to stand for seven days. The columns were then exposed to another ten-day cycle, and so on. Duplicate experimental conditions were created for untreated BH and FW soil columns for comparison.

Figure 19:
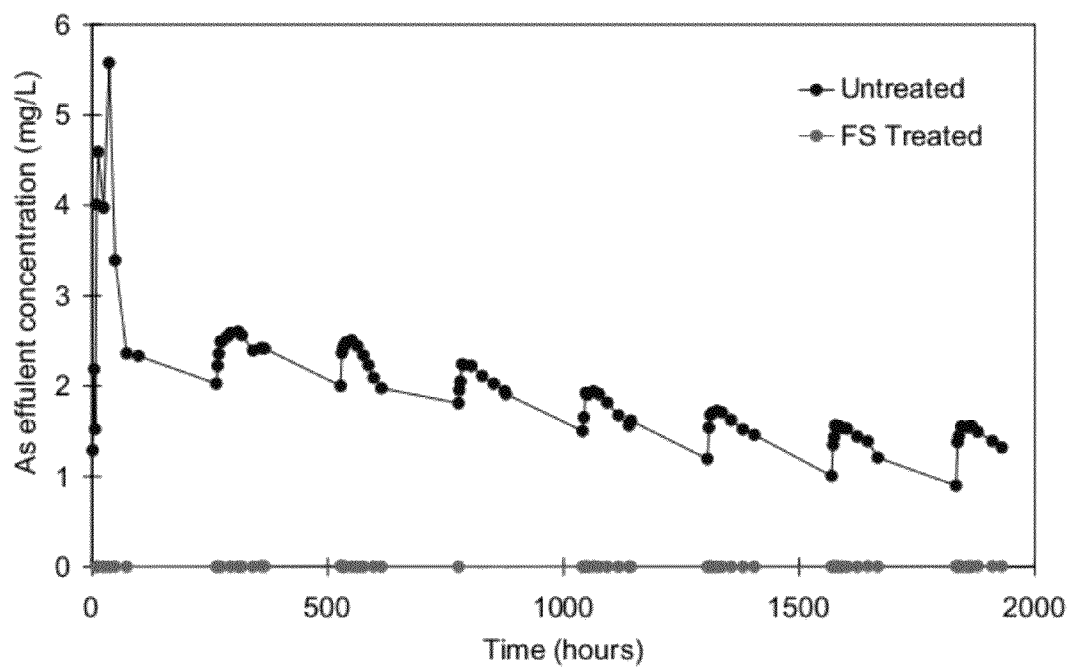
FIG. 19 illustrates cyclic SPLP leaching results for untreated and FS-treated BH soil.

FIG. 19 shows the arsenic concentrations in the BH soil column effluents when exposed to 8 successive wet-dry cycles. The first leaching cycle mobilized the soluble and exchangeable arsenic in the untreated BH soil column and caused an initial peak. From the second cycle to the end of this experiment, effluent arsenic concentrations followed similar n-shape patterns having decreasing concentrations with each successive leaching cycle. The n-shape pattern demonstrates that arsenic release from the untreated columns is partly controlled by kinetics. From the beginning of each cycle, approximately one day is required for the aqueous arsenic concentration to reach equilibrium with the solid phase. In contrast to the untreated soil, the wet-dry cycle did not cause any arsenic mobilization for the FS-treated BH column. No detectable arsenic was observed during the 8 ten-day cycles for this column.

Figure 20:
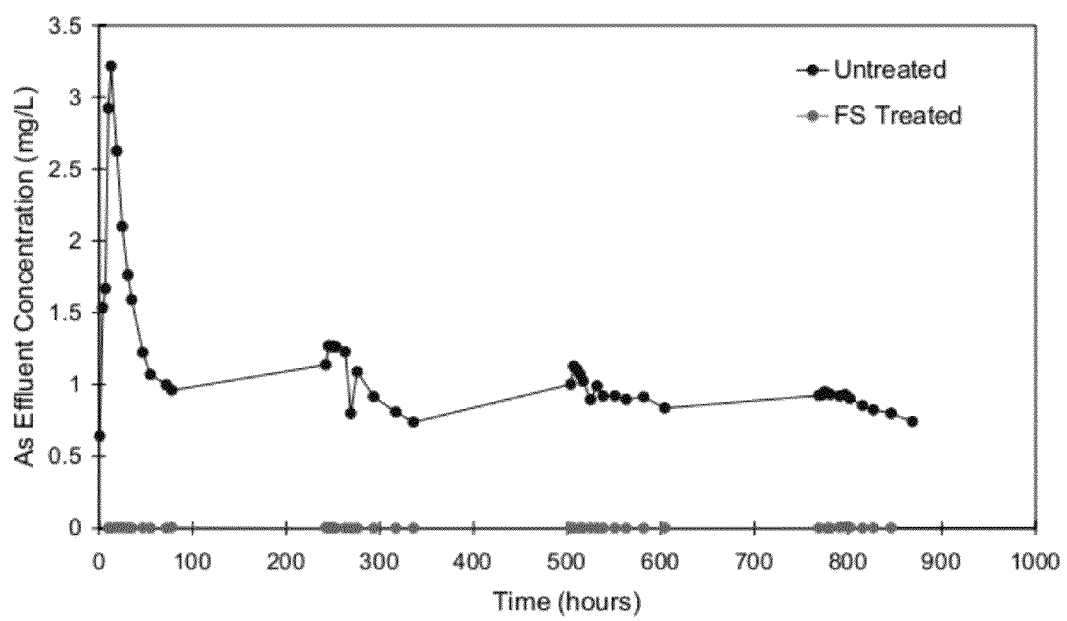
FIG. 20 illustrates cyclic SPLP leaching results for untreated and FS-treated FW soil.

FIG. 20 shows the column effluent arsenic concentrations when FS-treated and untreated FW soil was exposed to 4 wet-dry cycles. As with BW soil, an initial peak was observed during the first leaching cycle for untreated FW soil. However, kinetic control on arsenic release from untreated FW soil was not as obvious as it was for untreated BH soil. Cyclic leaching did not cause any arsenic mobilization from the FS-treated FW column, either. No detectable arsenic was observed during the 4 ten-day leaching cycles for this column.

Results and Conclusions. Column experiments were performed on the five contaminated soils to evaluate the arsenic fixation methods under simulated field conditions. The experimental data show: no detectable arsenic was observed in the FS- or FSLA-treated column effluents during the whole course of the SPLP leaching experiment, which simulated more than 280 years of natural leaching; some arsenic was released during FS and FSLA treatment of the soil columns before iron breakthrough. Wetting-drying cycles did not remobilize any of the arsenic fixed by FS or FSLA treatments.

What is claimed is:

1. An in-situ method for immobilizing a contaminant in a medium, comprising:
   contacting a medium in-situ with a chemical reagent, the medium comprising a contaminant, wherein the contacting the medium in-situ with a chemical reagent does not involve physical mixing of the medium and the chemical reagent; and
   immobilizing at least a portion of the contaminant in the medium in-situ to yield an immobilized contaminant in the medium, wherein the immobilized contaminant in the medium is neither extracted from the medium nor degraded by the chemical reagent;
   wherein the contaminant comprises arsenic; and
   wherein the chemical reagent comprises ferrous sulfate and lanthanum chloride.

2. The in-situ method for immobilizing a contaminant in a medium of claim 1, wherein a molar ratio of iron to arsenic of at least about 10 to about 1 is achieved.

3. The in-situ method for immobilizing a contaminant in a medium of claim 1, wherein a weight-based ratio of lanthanum to iron is about 1.2 to about 1.

4. The in-situ method for immobilizing a contaminant in a medium of claim 1, further comprising providing a chemical additive to the medium.

5. The in-situ method for immobilizing a contaminant in a medium of claim 1, further comprising:
   flushing the medium in-situ with a flushing agent in a flushing zone, wherein the flushing agent mobilizes at least a portion of the contaminant in the medium.

6. The in-situ method for immobilizing a contaminant in a medium of claim 5, further comprising:
   capturing at least a portion of the flushing agent with a neutralizing agent in the medium in-situ in a capture zone, the capture zone located down-gradient from the flushing zone.

7. The in-situ method for immobilizing a contaminant in a medium of claim 5, further comprising:
   extracting at least a portion of the flushing agent and the contaminant from the medium within or down-gradient of the flushing zone.

8. The in-situ method for immobilizing a contaminant in a medium of claim 1, further comprising:
   flushing the medium in-situ with a flushing agent in a flushing zone, wherein the flushing agent mobilizes at least a portion of the contaminant in the medium;
   extracting at least a portion of the flushing agent and the contaminant from the medium within or down-gradient of the flushing zone; and
   capturing at least a portion of the flushing agent with a neutralizing agent in the medium in-situ in a capture zone, the capture zone located down-gradient from the flushing zone.

9. The in-situ method for immobilizing a contaminant in a medium of claim 5, wherein the flushing agent comprises a Lewis acid, a Lewis base, a Bronsted acid, a Bronsted base, or a combination thereof.

10. The in-situ method for immobilizing a contaminant in a medium of claim 8, wherein the chemical reagent comprises an iron-containing salt, the flushing agent comprises phosphoric acid, and the neutralizing agent comprises a calcium salt.

11. An in-situ method for immobilizing arsenic in a soil, comprising:
contacting a soil in-situ with a chemical reagent, the soil comprising arsenic and the chemical reagent comprising an iron-containing salt and a lanthanum-containing salt, wherein the contacting the soil in-situ with a chemical reagent does not involve physical mixing of the soil and the chemical reagent; and
immobilizing at least a portion of the arsenic in the soil in-situ to yield immobilized arsenic the soil, wherein the immobilized arsenic in the soil is neither extracted from the soil nor degraded by the chemical reagent
wherein the iron-containing salt comprises ferrous sulfate and the lanthanum-containing salt comprises lanthanum chloride.

12. The in-situ method for immobilizing a contaminant in a medium of claim 11, wherein a molar ratio of iron to arsenic of at least about 10 to about 1 is achieved.

13. The in-situ method for immobilizing a contaminant in a medium of claim 11, wherein a weight-based ratio of lanthanum to iron is about 1.2 to about 1.

14. The in-situ method for immobilizing a contaminant in a medium of claim 11, further comprising providing a chemical additive to the medium.

* * * * *